US012597358B2

(12) United States Patent
Lee

(10) Patent No.: US 12,597,358 B2
(45) Date of Patent: Apr. 7, 2026

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventor: Shun Lee, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 490 days.

(21) Appl. No.: 18/003,077

(22) PCT Filed: Jun. 11, 2021

(86) PCT No.: PCT/JP2021/022293
§ 371 (c)(1),
(2) Date: Dec. 22, 2022

(87) PCT Pub. No.: WO2022/004333
PCT Pub. Date: Jan. 6, 2022

(65) Prior Publication Data
US 2023/0343228 A1 Oct. 26, 2023

(30) Foreign Application Priority Data
Jul. 1, 2020 (JP) ................................. 2020-113814

(51) Int. Cl.
*G08G 5/55* (2025.01)
*G05D 1/00* (2024.01)
(Continued)

(52) U.S. Cl.
CPC ............. *G08G 5/55* (2025.01); *G05D 1/0038* (2013.01); *G06V 20/17* (2022.01); *G08G 5/57* (2025.01)

(58) Field of Classification Search
None
See application file for complete search history.

(56) References Cited

U.S. PATENT DOCUMENTS 10,436,591 B2 * 10/2019 Sabe ...................... G01C 21/18
2018/0259353 A1 * 9/2018 Tsurumi ............... G01S 13/867
(Continued)

FOREIGN PATENT DOCUMENTS

JP 2006-064550 A 3/2006
JP 2007-322138 A 12/2007
(Continued)

OTHER PUBLICATIONS

International Search Report and Written Opinion of PCT Application No. PCT/JP2021/022293, issued on Aug. 10, 2021, 12 pages of ISRWO.

*Primary Examiner* — Amelia Vorce
(74) *Attorney, Agent, or Firm* — CHIP LAW GROUP

(57) ABSTRACT

Achieved is a configuration in which a reliability of self-position estimation of a mobile device, such as a drone, is calculated to perform warning display and flight control. A sensor data acquisition unit that acquires detection information of a sensor provided in a mobile body, a self-position estimation unit that receives an input of the detection information of the sensor from the sensor data acquisition unit and executes self-position estimation of the mobile body, an environment information analysis unit that analyzes environment information such as ambient brightness when a self-position estimation process has been executed in the self-position estimation unit and a score of a feature point of a camera-captured image, and an estimated self-position reliability calculation unit that calculates a reliability of a self-position estimated by the self-position estimation unit on the basis of the environment information analyzed by the environment information analysis unit are (Continued)

provided to perform warning display and flight control on the basis of the calculated reliability.

16 Claims, 20 Drawing Sheets

(51) Int. Cl.
  *G06V 20/17* (2022.01)
  *G08G 5/57* (2025.01)

(56) References Cited

U.S. PATENT DOCUMENTS

| | | | | |
|---|---|---|---|---|
| 2018/0292822 A1* | 10/2018 | Ichikawa | | G05D 1/0257 |
| 2019/0027045 A1* | 1/2019 | Laur | | B60W 30/16 |
| 2019/0064830 A1* | 2/2019 | Funayama | | G05D 1/0274 |
| 2019/0137274 A1* | 5/2019 | Sabe | | G01C 21/1656 |
| 2019/0162815 A1* | 5/2019 | Taniguchi | | G01S 5/02585 |
| 2019/0376791 A1* | 12/2019 | Sabe | | G05D 1/102 |
| 2020/0114933 A1* | 4/2020 | Ono | | B60K 35/28 |
| 2020/0223450 A1* | 7/2020 | Iwamoto | | G05D 1/0212 |
| 2021/0095992 A1* | 4/2021 | Kitaura | | G06T 7/579 |
| 2021/0147077 A1* | 5/2021 | Raabe | | G01S 7/4814 |
| 2021/0263530 A1* | 8/2021 | Kitajima | | G06T 7/73 |
| 2022/0137638 A1* | 5/2022 | Tomono | | G06T 7/579 |
| | | | | 701/25 |
| 2022/0366599 A1* | 11/2022 | Okada | | G06T 7/246 |
| 2023/0315119 A1* | 10/2023 | Hamalainen | | G05D 1/027 |
| | | | | 701/25 |

FOREIGN PATENT DOCUMENTS

| | | |
|---|---|---|
| JP | 2009-300355 A | 12/2009 |
| JP | 2016-188806 A | 11/2016 |
| JP | 2017-188067 A | 10/2017 |
| JP | 2018-155732 A | 10/2018 |
| JP | 2019-036227 A | 3/2019 |
| JP | 2020-017173 A | 1/2020 |

* cited by examiner

AUTONOMOUS FLIGHT TYPE

10 DRONE

CONTROLLER PILOTING TYPE

10 DRONE

1 USER (PILOT)

20 CONTROLLER
(REMOTE CONTROL DEVICE)

EXAMPLE OF RESULTANT DATA OF FEATURE POINT DETECTION PROCESS

EXAMPLE OF RESULTANT DATA OF PERSON DETECTION PROCESS

PERSON DETECTION FRAME

*FIG. 14*

20 CONTROLLER

10 DRONE

SELF-POSITION ESTIMATION ACCURACY IS DECREASING

DRONE CURRENT LOCATION

1

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2021/022293 filed on Jun. 11, 2021, which claims priority benefit of Japanese Patent Application No. JP 2020-113814 filed in the Japan Patent Office on Jul. 1, 2020. Each of the above-referenced applications is hereby incorporated herein by reference in its entirety.

TECHNICAL FIELD

The present disclosure relates to an information processing apparatus, an information processing system, and an information processing method, and a program. More specifically, the present technology relates to an information processing apparatus, an information processing system, an information processing method, and a program that enable safe flight or travel of a mobile device, for example, a drone or the like.

BACKGROUND ART

In recent years, the use of drones, which are small flying objects, has rapidly increased. For example, a drone is equipped with a camera and used for processing of capturing an image of a landscape on the ground from midair, and the like. Furthermore, the use of drones for package delivery is also planned, and various experiments have been conducted.

Currently, in many countries, it is required to control the flight of a drone by operating a controller under human monitoring, that is, in a range visible to a person. In the future, however, it is recommended that many autonomous flight-type drones that do not require visual monitoring by a person, that is, drones that autonomously fly from departure points to destinations are to be used.

Such an autonomous flight-type drone flies from the departure point to the destination by using, for example, information regarding communication with a control center and GPS position information.

In the future, it is expected that the possibility of occurrence of a collision between a drone and a building, a collision between drones, and a crash of a drone increases as drones operated by a controller and autonomous flight-type drones increase.

If a drone falls in a region where a large number of vehicles and people come and go, such as an urban area, a big accident is likely to occur.

As a related art that discloses a configuration configured for safe flight of a drone, for example, there is Patent Document 1 (Japanese Patent Application Laid-Open No. 2006-064550).

Patent Document 1 discloses a configuration in which a region in which communication between a drone and a controller that controls the drone is possible is searched for and flight is performed in the region.

However, a technology described in this document is limited to flight control in a range where the communication using the controller is possible, and has a problem that it is difficult to apply an autonomous flight-type drone.

2

CITATION LIST

Patent Document

Patent Document 1: Japanese Patent Application Laid-Open No. 2006-064550

SUMMARY OF THE INVENTION

Problems to be Solved by the Invention

The present disclosure has been made in view of the problems described above, for example, and an object thereof is to provide an information processing apparatus, an information processing system, and an information processing method, and a program which enable safe flight or travel of a mobile device such as a drone.

Solutions to Problems

A first aspect of the present disclosure is an information processing apparatus including:
- a sensor data acquisition unit that acquires detection information of a sensor provided in a mobile body;
- a self-position estimation unit that receives an input of the detection information of the sensor from the sensor data acquisition unit and executes self-position estimation of the mobile body;
- an environment information analysis unit that receives an input of the detection information of the sensor from the sensor data acquisition unit and analyzes environment information when a self-position estimation process has been executed in the self-position estimation unit; and
- an estimated self-position reliability calculation unit that calculates a reliability of a self-position estimated by the self-position estimation unit on the basis of the environment information analyzed by the environment information analysis unit.

Moreover, a second aspect of the present disclosure is an information processing system including: a mobile device; and a controller that outputs control information of the mobile device,
the mobile device including:
- a sensor data acquisition unit that acquires detection information of a sensor provided in the mobile device;
- a self-position estimation unit that receives an input of the detection information of the sensor from the sensor data acquisition unit and executes self-position estimation of the mobile body;
- an environment information analysis unit that receives an input of the detection information of the sensor from the sensor data acquisition unit and analyzes environment information when a self-position estimation process has been executed in the self-position estimation unit; and
- an estimated self-position reliability calculation unit that calculates a reliability of a self-position estimated by the self-position estimation unit on the basis of the environment information analyzed by the environment information analysis unit and outputs the calculated reliability of the estimated self-position to the controller, and
the controller including:
- an information display unit that displays the reliability of the estimated self-position input from the estimated self-position reliability calculation unit of the mobile device;

an operation unit capable of inputting a movement route of the mobile device; and a mobile body control signal output unit that generates the control information for moving the mobile device according to the movement route input via the operation unit and outputs the control information to the mobile device.

Moreover, a third aspect of the present disclosure is an information processing method executed in an information processing apparatus, the information processing method executing:

a sensor data acquisition step of acquiring, by a sensor data acquisition unit, detection information of a sensor provided in a mobile body;

a self-position estimation step of receiving, by a self-position estimation unit, an input of the detection information of the sensor from the sensor data acquisition unit and executing self-position estimation of the mobile body;

an environment information analysis step of receiving, by an environment information analysis unit, an input of the detection information of the sensor from the sensor data acquisition unit and analyzing environment information when a self-position estimation process has been executed in the self-position estimation unit; and an estimated self-position reliability calculation step of calculating, by an estimated self-position reliability calculation unit, a reliability of a self-position estimated by the self-position estimation unit on the basis of the environment information analyzed by the environment information analysis unit.

Moreover, a fourth aspect of the present disclosure is an information processing method executed in an information processing system including a mobile device and a controller that outputs control information of the mobile device, the information processing method executing:

in the moving apparatus, a sensor data acquisition step of acquiring, by a sensor data acquisition unit, detection information of a sensor provided in a mobile body;

a self-position estimation step of receiving, by a self-position estimation unit, an input of the detection information of the sensor from the sensor data acquisition unit and executing self-position estimation of the mobile body;

an environment information analysis step of receiving, by an environment information analysis unit, an input of the detection information of the sensor from the sensor data acquisition unit and analyzing environment information when a self-position estimation process has been executed in the self-position estimation unit; and an estimated self-position reliability calculation step of calculating, by an estimated self-position reliability calculation unit, a reliability of a self-position estimated by the self-position estimation unit on the basis of the environment information analyzed by the environment information analysis unit and outputting the calculated reliability of the estimated self-position to the controller, and in the controller, an information display step of displaying, by an information display unit, the reliability of the estimated self-position input from the estimated self-position reliability calculation unit of the mobile device; and a mobile body control signal output step of generating, by a mobile body control signal output unit, the control information for moving the mobile device according to a movement route in response to an input of the movement route of the mobile device via an operation unit, and outputting the control information to the mobile device.

Moreover, a fifth aspect of the present disclosure is a program for causing an information processing apparatus to execute information processing, the program causing:

a sensor data acquisition unit to execute a sensor data acquisition step of acquiring detection information of a sensor provided in a mobile body;

a self-position estimation unit to execute a self-position estimation step of receiving an input of the detection information of the sensor from the sensor data acquisition unit and executing self-position estimation of the mobile body;

an environment information analysis unit to execute an environment information analysis step of receiving an input of the detection information of the sensor from the sensor data acquisition unit and analyzing environment information when a self-position estimation process has been executed in the self-position estimation unit; and an estimated self-position reliability calculation unit to execute an estimated self-position reliability calculation step of calculating a reliability of a self-position estimated by the self-position estimation unit on the basis of the environment information analyzed by the environment information analysis unit.

Note that the program of the present disclosure is, for example, a program that can be provided as a storage medium or a communication medium provided in a computer-readable form to an information processing apparatus or a computer system that can execute various program codes. As such a program is provided in the computer-readable form, processing according to the program can be realized on the information processing apparatus or the computer system.

Still other objects, characteristics and advantages of the present disclosure will become apparent from a detailed description based on embodiments of the present disclosure as described later and accompanying drawings. Note that the term "system" in the present specification refers to a logical set configuration of a plurality of apparatuses, and is not limited to a system in which apparatuses of the respective configurations are provided in the same housing.

According to a configuration of an embodiment of the present disclosure, a configuration is achieved in which a reliability of self-position estimation of a mobile device, such as a drone, is calculated to perform warning display and flight control.

Specifically, for example, a sensor data acquisition unit that acquires detection information of a sensor provided in a mobile body, a self-position estimation unit that receives an input of the detection information of the sensor from the sensor data acquisition unit and executes self-position estimation of the mobile body, an environment information analysis unit that analyzes environment information such as ambient brightness when a self-position estimation process has been executed in the self-position estimation unit and a score of a feature point of a camera-captured image, and an estimated self-position reliability calculation unit that calculates a reliability of a self-position estimated by the self-position estimation unit on the basis of the environment information analyzed by the environment information analysis unit are provided to perform the warning display and the flight control on the basis of the calculated reliability.

With this configuration, the configuration is achieved in which the reliability of the self-position estimation of the mobile device, such as the drone, is calculated to perform the warning display and the flight control.

Note that the effects described in the present specification are merely examples and are not limited, and there may be additional effects.

BRIEF DESCRIPTION OF DRAWINGS

FIG. 14 is a diagram for describing an information display example on an information display unit.

MODE FOR CARRYING OUT THE INVENTION

Hereinafter, details of an information processing apparatus, an information processing system, and an information processing method, and a program according to the present disclosure will be described with reference to the drawings. Note that a description will be made according to the following items.

1. Regarding Outline of Flight Mode of Drone And Processing of Present Disclosure
2. Regarding Configuration of Information Processing Apparatus of Present Disclosure And Processing to Be Executed
3. Regarding Sequence of Processing Executed by Information Processing Apparatus of Present Disclosure
4. Regarding Configuration for Performing Drone Control from Outside
5. Regarding Hardware Configuration Example of Information Processing Apparatus
6. Summary of Configuration of Present Disclosure

[1. Regarding Outline of Flight Mode of Drone And Processing of Present Disclosure]

First, an example of a flight mode of a drone and an outline of processing of the present disclosure will be described with reference to FIGS. 1A and 1B.

Note that an example in which a drone is used as an example of an autonomous mobile body will be described hereinafter, but the autonomous mobile body of the present disclosure is not limited to the drone, and includes various mobile bodies such as an autonomous traveling robot and an automated vehicle.

As described above, a current drone is required to control flight by operating a controller under human monitoring, that is, in a range visible to a person in many countries. In the future, however, it is assumed that autonomous flight-type drones that do not require visual monitoring by a person, that is, drones that autonomously fly from departure points to destinations are to be used. Such an autonomous flight-type drone flies from the departure point to the destination by using, for example, information regarding communication with a control center and GPS position information.

For example, a specific usage mode of the autonomous flight-type drones is package delivery by drones.

Flight examples of a general drone will be described with reference to FIGS. 1A and 1B.

Figures 1A, 1B:
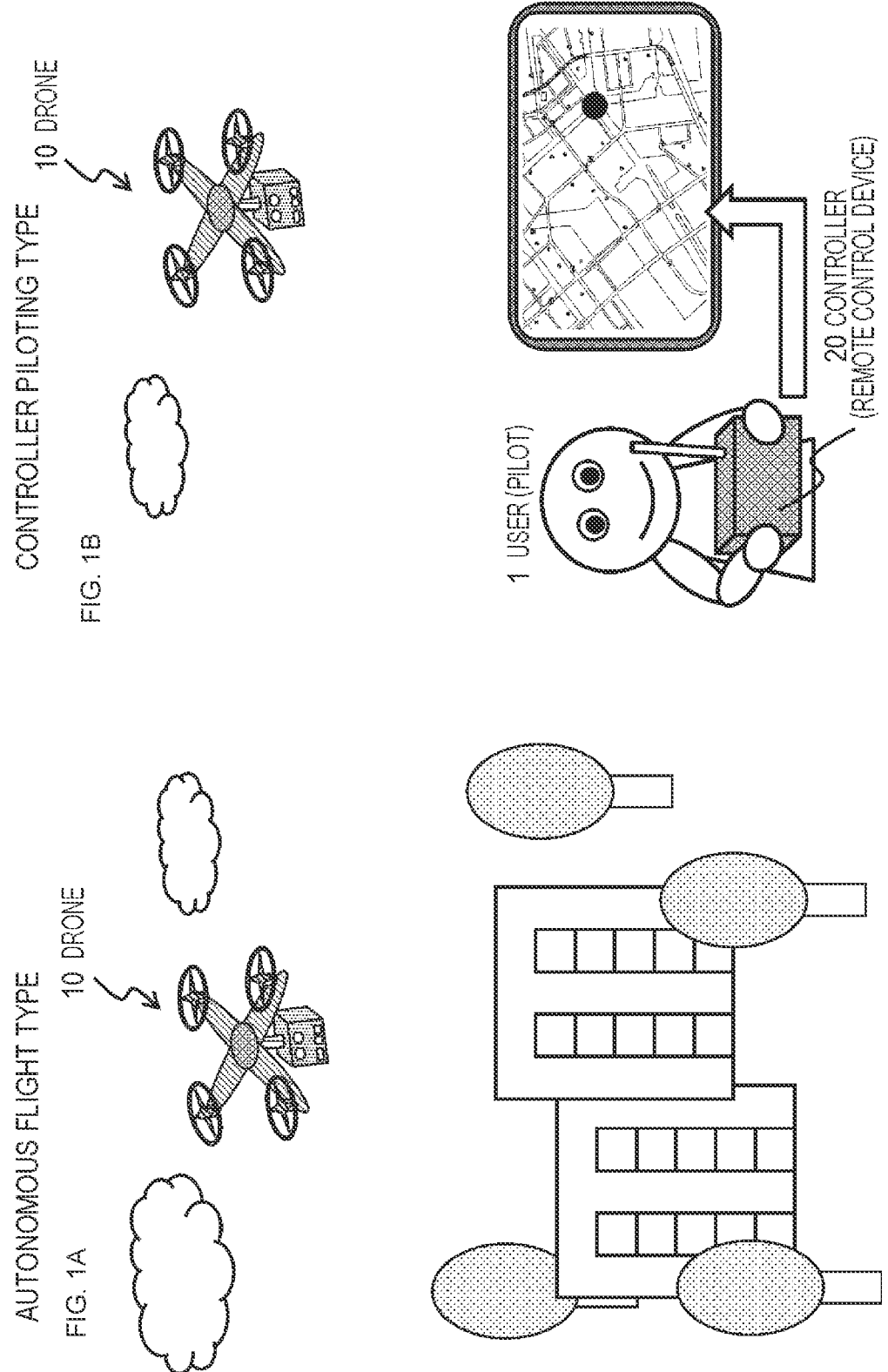
FIGS. 1A and 1B are diagrams for describing an example of flight control of a drone.

FIGS. 1A and 1B illustrate the following two types of drone flight examples:

FIG. 1A autonomous flight type; and

FIG. 1B controller piloting type.

The autonomous flight type in FIG. 1A illustrates an example of a drone 10 that autonomously flies from a departure point to a destination. The autonomous flight-type drone 10 flies from the departure point to the destination using, for example, communication information with a control center, GPS position information, an analysis result of an image captured by a mounted camera, and the like.

The controller piloting type in FIG. 1B directly transmits a signal for controlling the drone 10 from a controller (remote control device) 20 owned by a user (pilot) 1 and controls the flight of the drone 10.

Note that this controller piloting type includes not only a mode in which the user (pilot) 1 directly visually observes and controls the drone 10 but also a mode in which a current position and a movement route (flight route) of the drone 10 are displayed on a screen of the controller (remote control device) 20 owned by the user (pilot) 1 and the user (pilot) 1 controls the flight of the drone 10 while viewing the screen.

The processing of the present disclosure can be used in any of the autonomous flight type in FIG. 1A and the controller piloting type illustrated in FIGS. 1A and 1B.

An information processing apparatus of the present disclosure is mounted inside the drone 10 illustrated in FIGS. 1A and 1B, for example, and performs self-position estimation using an image captured by a GPS, a camera, or the like.

It is essential to accurately estimate a self-position in order for the user to pilot the drone or for the drone to autonomously move.

The self-position estimation is performed using detection information of a camera or a sensor such as light detection and ranging or laser imaging detection and ranging (LiDAR) in addition to a GPS.

Note that a simultaneous localization and mapping (SLAM) process is known as a representative example of a self-position estimation process using a camera-captured image.

The SLAM process is a process of executing camera position identification (localization) and environmental map creation (mapping) in parallel.

The SLAM process is a process of capturing images (a moving image) by a camera, analyzing a trajectory of a feature point included in the plurality of captured images to estimate a three-dimensional position of the feature point and estimating (localizing) (self) position and attitude of the camera, and can create (map) a surrounding map (environmental map) using information of the three-dimensional position information of the feature point. In this manner, the process of executing the (self) position identification (localization) of the camera and the creation (mapping) of the surrounding map (environmental map) in parallel is called SLAM.

However, the self-position estimation process using the image captured by the GPS or the camera has a problem that estimation accuracy varies depending on an environment.

For example, in a shade of a building in which reception from a GPS satellite is difficult, the estimation accuracy decreases when the self-position estimation process is performed using a GPS signal.

Furthermore, the estimation accuracy decreases when the self-position estimation process using the camera-captured image is performed in a dark environment.

In an environment where it is difficult to accurately perform the self-position estimation, the autonomous movement becomes difficult.

In order to solve such a problem, the information processing apparatus of the present disclosure calculates a reliability of a result of the self-position estimation executed by the information processing apparatus inside the drone 10.

Specifically, examples of information regarding an environment in which the self-position estimation process has been executed include:

(a) ambient brightness;

(b) score of feature point detected from camera-captured image;

(c) number of static objects detected from camera-captured image or area occupancy of static objects in image; and (d) number of GPS satellites from which GPS signals can be received.

For example, these pieces of environment information are analyzed, and the reliability of the self-position estimation result (="estimated self-position reliability") is calculated on the basis of analysis results.

The information processing apparatus of the present disclosure further performs generation and correction of an action plan, for example, correction of a flight route, flight stop processing, and the like, on the basis of the "estimated self-position reliability" calculated on the basis of the analysis results of the environment information, and performs flight control on the basis of the generated and corrected action plan.

Moreover, a warning regarding danger, information of a corrected flight route, and the like are transmitted to and displayed on a display unit of a monitoring center that monitors the flight of the drone 10 and the controller.

[2. Regarding Configuration of Information Processing Apparatus of Present Disclosure and Processing to be Executed]

Next, a configuration of the information processing apparatus of the present disclosure and processing to be executed will be described.

Figure 2:
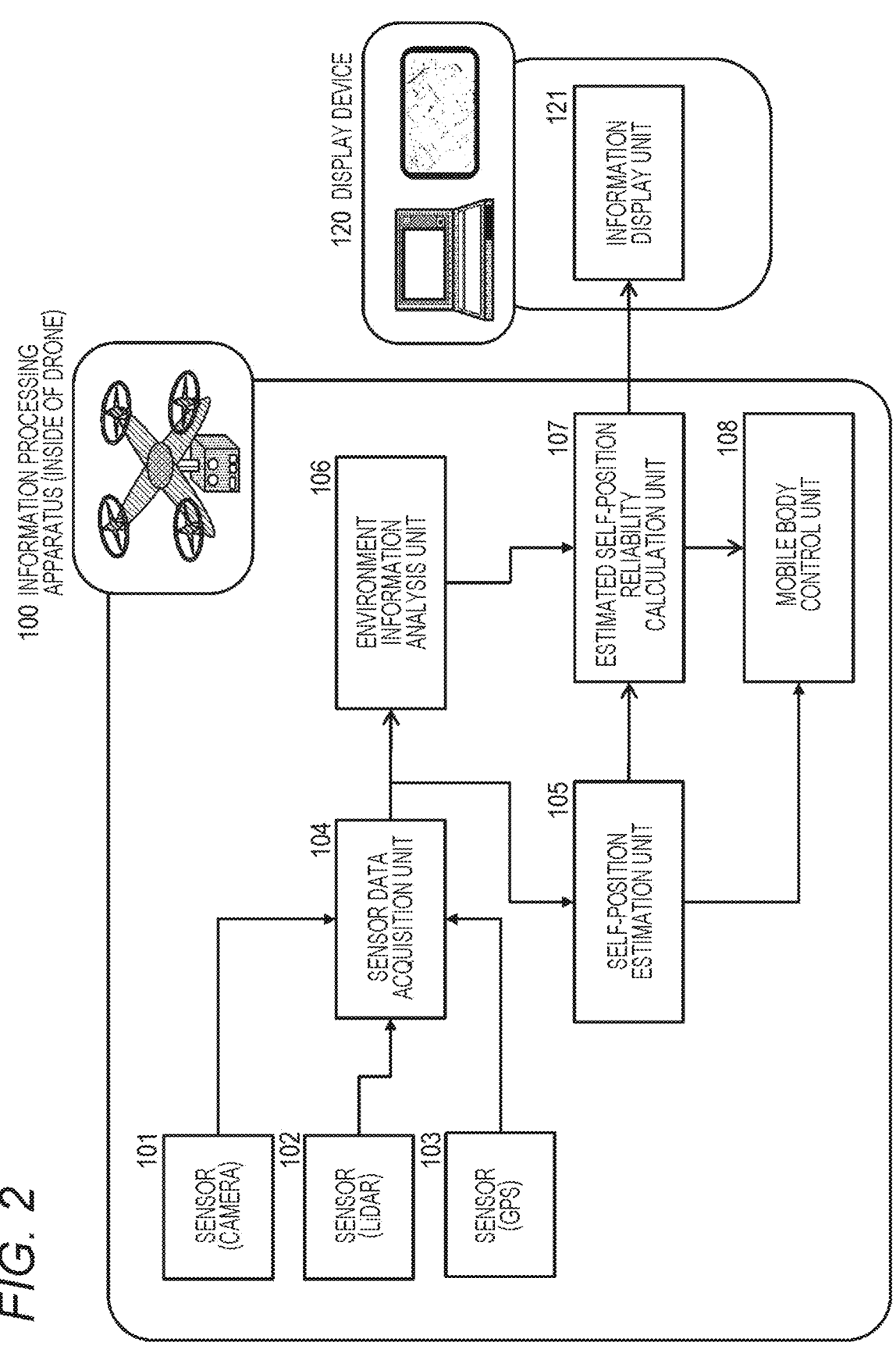
FIG. 2 is a diagram for describing a configuration example of an information processing apparatus of the present disclosure.

FIG. 2 is a block diagram illustrating a configuration example of an information processing apparatus 100 of the present disclosure.

Note that the information processing apparatus 100 illustrated in FIG. 2 is an apparatus provided inside the drone 10.

Furthermore, a display device 120 illustrated in FIG. 2 is, for example, a display device of the monitoring center or the user (pilot).

As illustrated in FIG. 2, the information processing apparatus 100 includes a sensor (camera) 101, a sensor (LiDAR) 102, a sensor (GPS) 103, a sensor data acquisition unit 104, a self-position estimation unit 105, an environment information analysis unit 106, an estimated self-position reliability calculation unit 107, and a mobile body control unit 108.

Furthermore, the display device 120 includes an information display unit 121.

Details of each constituent part of the information processing apparatus 100 and processing to be executed will be sequentially described.

The sensor (camera) 101 is a camera that captures an image of an external environment, and includes any one of a monocular camera, a stereo camera, an infrared (IR) light camera, or the like or a combination of a plurality of cameras.

The sensor (LiDAR) 102 is light detection and ranging or laser imaging detection and ranging (LiDAR) and can measure a distance to an obstacle and the like.

The sensor (GPS) 103 is a sensor configured to receive a signal from a GPS satellite and acquire current longitude and latitude information.

Note that only the three types of sensors are illustrated in FIG. 2, but this is an example, and a configuration including sensors other than these may be adopted. For example, a configuration in which a ToF sensor, an ultrasonic sensor, a radar, a sonar, and the like are provided may be adopted.

The sensor data acquisition unit 104 acquires detection information of each sensor.

The sensor data acquisition unit 104 outputs sensor detection information acquired from each sensor to the self-position estimation unit 105 and the environment information analysis unit 106.

The self-position estimation unit 105 estimates a current self-position of the drone 10 using the sensor detection information input from the sensor data acquisition unit 104.

The self-position estimated by the self-position estimation unit 105 is output to the estimated self-position reliability calculation unit 107 and the mobile body control unit 108.

The mobile body control unit 108 causes the drone to fly according to a predetermined movement route (flight route) on the basis of the self-position estimated by the self-position estimation unit 105.

The self-position estimation unit 105 performs, for example, a self-position estimation process based on acquisition information of a GPS sensor, self-position estimation to which the simultaneous localization and mapping (SLAM) process described above is applied, and the like.

As described above, the SLAM process is the process of capturing images (a moving image) by a camera, analyzing a trajectory of a feature point included in the plurality of captured images to estimate a three-dimensional position of the feature point and estimating (localizing) (self) position and attitude of the camera, and can create (map) a surrounding map (environmental map) using information of the three-dimensional position information of the feature point.

Note that as one of SLAM techniques, there is an EKF-based SLAM using an extended Kalman filter (EKF).

The EKF-based SLAM is, for example, a method of continuously capturing images while moving a camera, obtaining a trajectory (tracking information) of a feature point included in the respective images, and simultaneously estimating the amount of movement of the camera and a three-dimensional position of the feature point by a moving stereo method.

A self-position estimation result estimated by the self-position estimation unit 105 is output to the estimated self-position reliability calculation unit 107 and the mobile body control unit 108.

On the other hand, the environment information analysis unit 106 also receives an input of the sensor detection information acquired by the sensor data acquisition unit 104.

The environment information analysis unit 106 receives the input of the sensor detection information acquired by the sensor data acquisition unit 104, and analyzes information regarding an environment in which the self-position estimation process has been executed on the basis of the input sensor detection information.

Specifically, as described above, regarding the environment at the time of executing the self-position estimation process, for example, the following pieces of environment information are analyzed:

(a) ambient brightness;

(b) score of feature point detected from camera-captured image;

(c) number of static objects detected from camera-captured image or area occupancy of static objects in image; and (d) number of GPS satellites from which GPS signals can be received.

"(a) Ambient brightness" is analyzed on the basis of, for example, a luminance of an image captured by the sensor (camera) 101. Moreover, analysis may be performed using detection information of an illuminance sensor in a configuration in which the illuminance sensor is mounted.

"(b) Score of feature point detected from camera-captured image" is executed as a process of calculating a score indicating the number of feature points extracted from an image captured by the sensor (camera) 101 or a reliability of the feature points.

Figure 3:
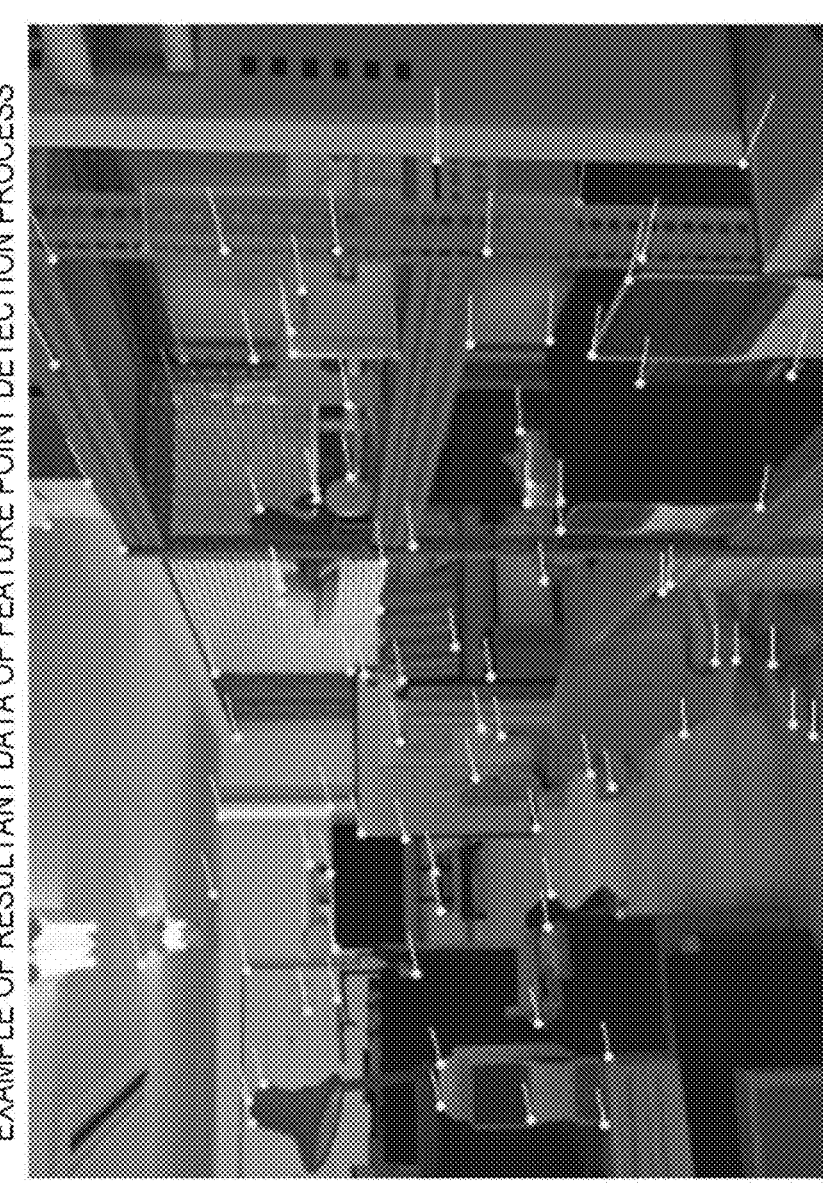
FIG. 3 is a view for describing an example of a process of detecting a feature point from a camera-captured image.

FIG. 3 illustrates an example of feature points extracted from an image captured by the sensor (camera) 101.

White dots in the image illustrated in FIG. 3 indicate the feature points.

Note that an existing technique, for example, Harris corner detection or the like can be applied to the feature point detection from the image.

The score of the feature point is calculated by applying a predefined feature point evaluation index such as "how noticeable a feature point is" or "is a feature point easily tracked?".

Note that, as a feature point score calculation process, an existing feature point score calculation process such as a score defined in the Harris corner detection process or the Shi-tomasi score can be applied.

"(c) Number of static objects detected from camera-captured image or area occupancy of static objects in image" is executed by, for example, a process of analyzing an image captured by the sensor (camera) 101 and discriminating a static object (body) and a dynamic object (body) from objects (bodies) included in the captured image.

This process is executed by analyzing continuously captured images, for example, a moving image.

Moreover, a process of detecting an object estimated to be a moving body such as a person or a car from the image captured by the sensor (camera) 101 may be applied.

Figure 4:
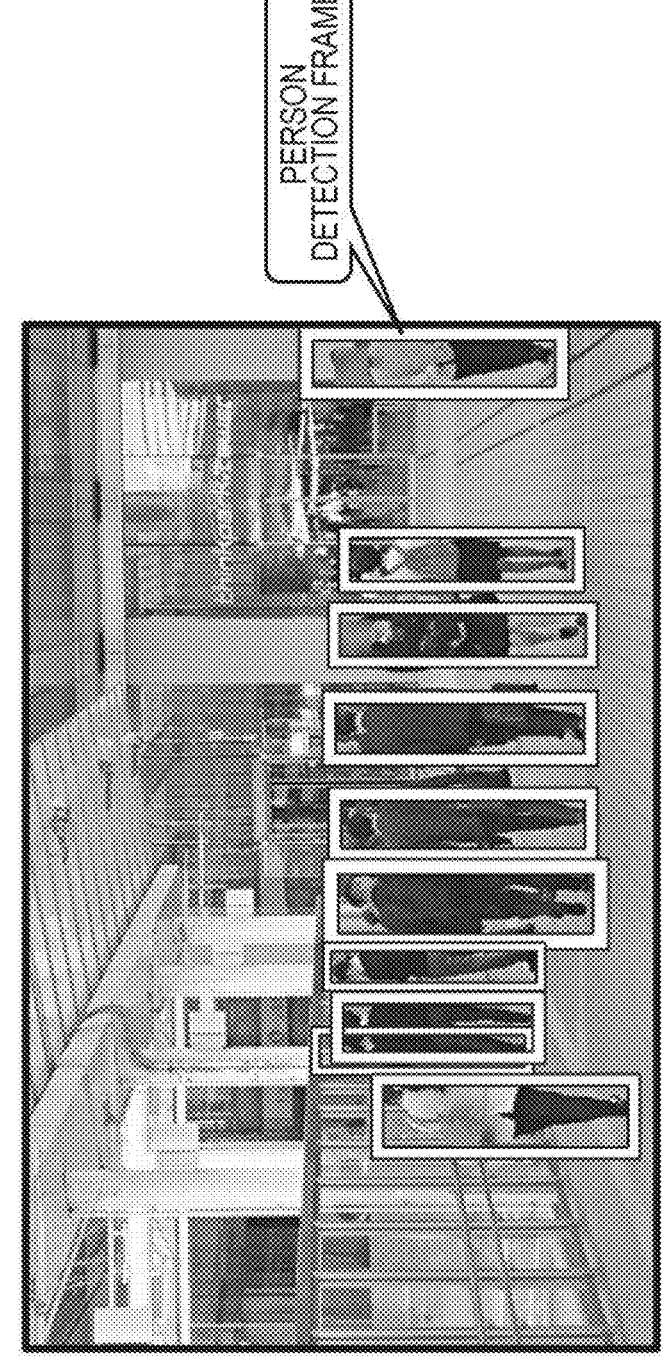
FIG. 4 is a view for describing an example of a process of detecting a person from a camera-captured image.

For example, FIG. 4 is an example of data in which a person has been detected by image analysis.

Such a person detection process can be performed by, for example, a process of detecting a pattern similar to a shape pattern of a person stored in advance in a storage unit from the captured image, that is, so-called pattern matching.

Moreover, semantic segmentation can also be used as the process of discriminating between the static object (body) and the dynamic object (body).

The semantic segmentation is a type of image recognition processing, and is a technique of performing a task for recognizing what a body in an image is in terms of a pixel level using deep learning. The semantic segmentation is, for example, a technology of identifying which object category each of constituent pixels (pixels) of a camera-captured image belongs to on the basis of a degree of matching between dictionary data (trained data) for object identification in which shape information and other feature information of various actual objects are registered and, for example, an object in the image.

This semantic segmentation enables identification of various objects included in the camera-captured image, for example, types of objects such as a person, a car, a building, a road, a tree, a pond, and a lawn.

Figure 5:
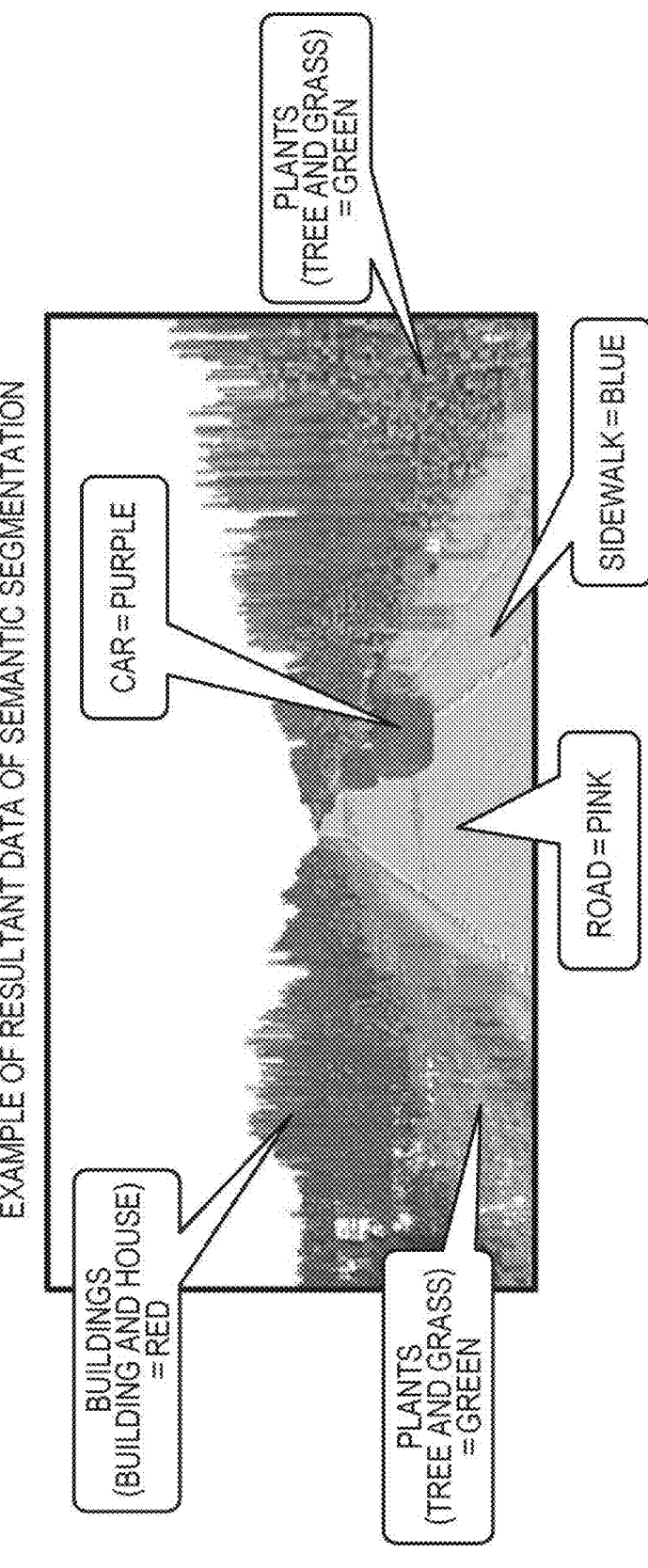
FIG. 5 is a view for describing semantic segmentation.

FIG. 5 is an image illustrating an example of a result of application of the semantic segmentation to a camera-captured image.

When the semantic segmentation is applied, various objects in the captured image are distinguished into predetermined colors according to object types and output.

That is, an object type of a pixel portion can be discriminated on the basis of an output color.

On the basis of the types of objects identified by the semantic segmentation, these identified objects can be classified into the static object (body) and the dynamic object (body).

Regarding "(d) number of GPS satellites from which GPS signals can be received", it is possible to acquire and analyze the number of GPS satellites with which the sensor (GPS) 103 can communicate during execution of the self-position estimation process by the self-position estimation unit 105.

In this manner, the environment information analysis unit 106 receives the input of the sensor detection information acquired by the sensor data acquisition unit 104 and analyzes information regarding an environment in which the self-position estimation unit 105 has executed the self-position estimation process on the basis of the input sensor detection information, for example, the following pieces of environment information:

(a) ambient brightness;

(b) score of feature point detected from camera-captured image;

(c) number of static objects detected from camera-captured image or area occupancy of static objects in image; and (d) number of GPS satellites from which GPS signals can be received.

Note that the environment information analysis unit 106 does not need to analyze all of the pieces of environment information in (a) to (d) described above, and may be configured to analyze at least one of the pieces of environment information in (a) to (d) described above.

However, preferably, it is preferable to adopt a configuration in which all or a plurality of the pieces of environment information in (a) to (d) described above is analyzed.

The environment information analyzed by the environment information analysis unit 106 is input to the estimated self-position reliability calculation unit 107.

The estimated self-position reliability calculation unit 107 calculates a reliability of a self-position estimated by the self-position estimation unit 105.

The estimated self-position reliability calculation unit 107 calculates the reliability of the estimated self-position on the basis of the environment information analyzed by the environment information analysis unit 106, that is, the environment information when the self-position estimation unit 105 has executed the self-position estimation.

As described above, the environment information analysis unit 106 analyzes, as the environment information when the self-position estimation unit 105 has executed the self-position estimation, for example, the following pieces of environment information:

(a) ambient brightness;

(b) score of feature point detected from camera-captured image;

(c) number of static objects detected from camera-captured image or area occupancy of static objects in image; and (d) number of GPS satellites from which GPS signals can be received, and inputs analysis results thereof to the estimated self-position reliability calculation unit 107.

The estimated self-position reliability calculation unit 107 calculates the reliability of the self-position estimated by the self-position estimation unit 105 on the basis of these pieces of environment information.

Note that, as described above, the environment information analysis unit 106 may be configured to analyze at least one of the pieces of environment information in (a) to (d) described above, and the estimated self-position reliability calculation unit 107 receives the input of at least one of the pieces of environment information in (a) to (d) described above and calculates the reliability of the self-position estimated by the self-position estimation unit 105.

A description will be given regarding an estimated self-position reliability calculation process in a case where the estimated self-position reliability calculation unit 107 receives an input of the following environment information of (a) ambient brightness from the environment information analysis unit 106, for example, as environment information when the self-position estimation unit 105 has executed self-position estimation.

Figure 6:
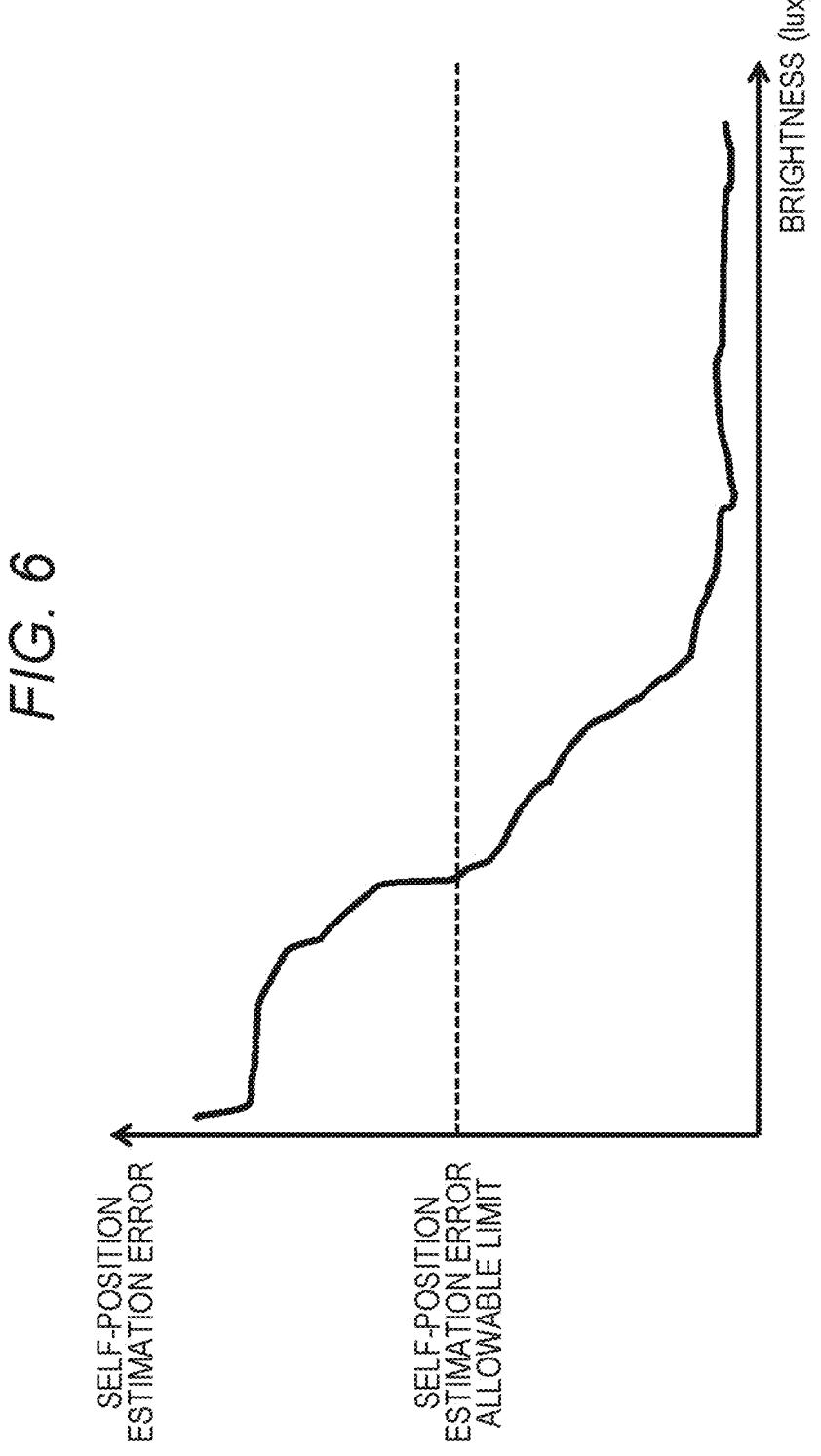
FIG. 6 is a diagram for describing a correspondence relationship between brightness and a self-position estimation error.

A graph illustrated in FIG. 6 is a graph in which a horizontal axis represents brightness (lux) and a vertical axis represents a self-position estimation error.

This graph is a graph generated in advance. For example, the graph is a graph generated by machine learning processing.

As can be understood from the graph, the self-position estimation error decreases as the brightness becomes brighter, so that highly accurate self-position estimation becomes possible. On the other hand, the self-position estimation error increases as the brightness becomes darker, so that the accuracy of the self-position estimation decreases.

In general, a self-position estimation process in which a camera-captured image is applied depends on the number of "clear feature points that can be acquired from the image", that is, "feature points with high scores".

The number of "high-score feature points" depends on a "luminance of the image".

The "luminance of the image" depends on an "exposure time" and "ambient brightness".

However, if the "exposure time" is too long, blurring increases, which affects the self-position accuracy. Therefore, the "accuracy of self-position estimation" depends on the "ambient brightness".

As a result, a relationship between the brightness and the self-position estimation error is a relationship illustrated in the graph of FIG. 6.

As illustrated in FIG. 6, the self-position estimation error decreases as the brightness becomes brighter, so that the highly accurate self-position estimation becomes possible. On the other hand, the self-position estimation error increases as the brightness becomes darker, so that the accuracy of the self-position estimation decreases.

Data corresponding to the graph illustrated in FIG. 6, that is, correspondence relationship data between the brightness (lux) and the self-position estimation error is stored in a storage unit of the information processing apparatus 100, and the estimated self-position reliability calculation unit 107 calculates a reliability of a self-position estimated by the self-position estimation unit 105 using the correspondence relationship data (=the graph illustrated in FIG. 6) between the brightness (lux) and the self-position estimation error.

In a specific reliability calculation process, for example, the reliability is calculated on the basis of an average luminance (pixel value) of the image captured by the sensor (camera) 101.

In addition, for example, in a case where an illuminance sensor is provided, a value (brightness (lux)) obtained from the illuminance sensor may be used. Furthermore, the exposure time may be calculated using an exposure time, a gain, or the like at the time of the image capturing by the sensor (camera) 101.

Figure 7:
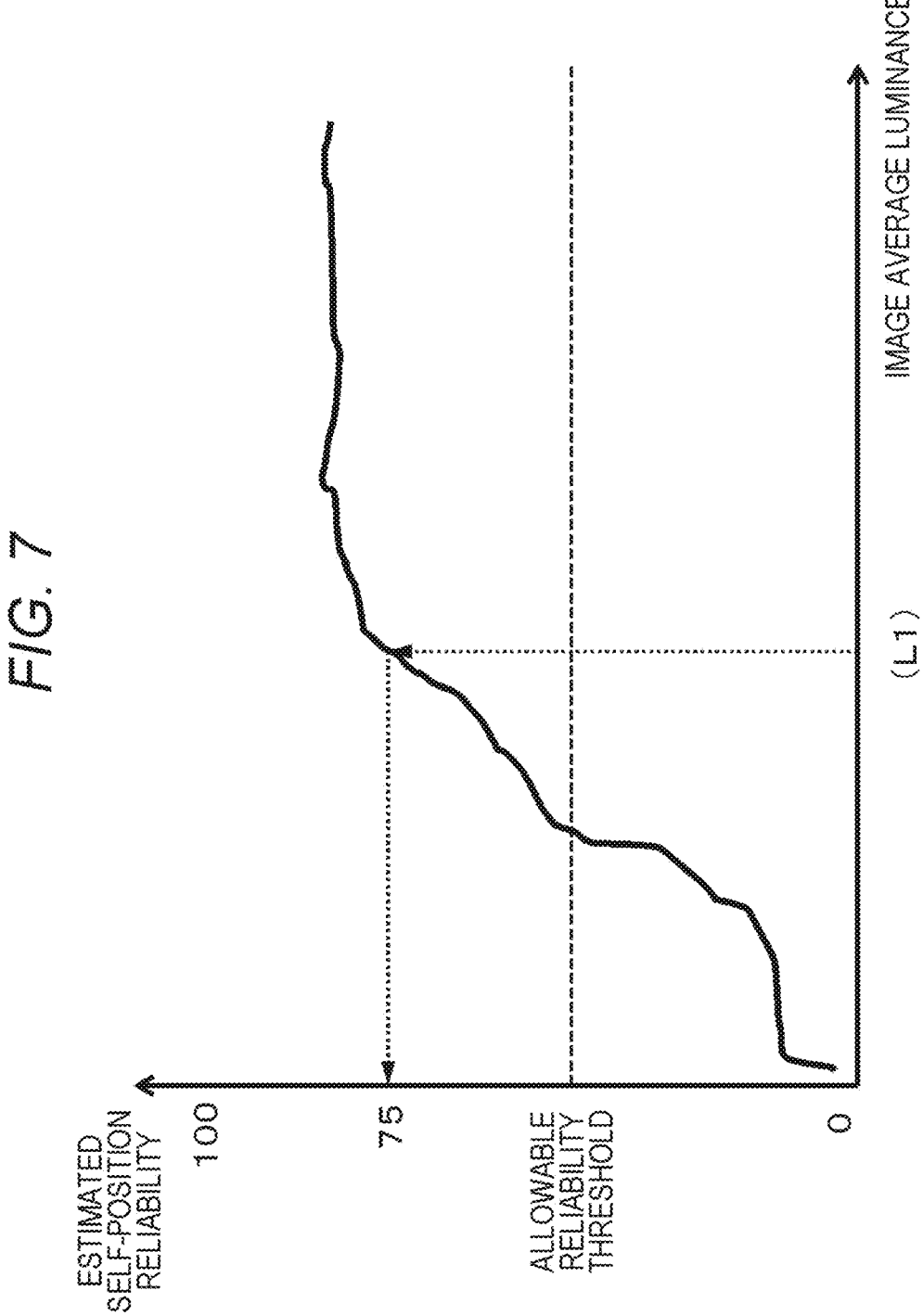
FIG. 7 is a diagram for describing a correspondence relationship between an image average luminance and an estimated self-position reliability.

For example, a correspondence relationship between the average luminance (pixel value) of the image captured by the sensor (camera) 101 and the reliability (0 to 100) of the self-position estimated by the self-position estimation unit 105 when the self-position estimation unit 105 has executed the self-position estimation is a graph illustrated in FIG. 7. Note that the example illustrated in FIG. 7 is an example in which the reliability is set to a value from the lowest reliability to the highest reliability as 0 to 100.

The graph illustrated in FIG. 7 is calculated from the graph of the correspondence relationship between the brightness (lux) and the self-position estimation error illustrated in FIG. 6.

Specifically, the graph illustrated in FIG. 7 can be generated by vertically inverting the graph of the correspondence relationship between the brightness (lux) and the self-position estimation error illustrated in FIG. 6.

The estimated self-position reliability calculation unit 107 calculates the reliability of the self-position estimated by the self-position estimation unit 105 using correspondence relationship data between the average luminance (pixel value) of the captured image and the estimated self-position reliability illustrated in FIG. 7.

Specifically, for example, in a case where the average luminance (pixel value) of the captured image captured by the sensor (camera) 101 is a luminance (L1) in the graph illustrated in FIG. 7 when the self-position estimation unit 105 has executed the self-position estimation, the reliability of the self-position estimated by the self-position estimation unit 105 is about 75. However, the reliability is set between the lowest reliability (0) to the highest reliability (100).

Next, a description will be given regarding an estimated self-position reliability calculation process in a case where the estimated self-position reliability calculation unit 107 receives an input of the following environment information of (b) score of feature point detected from camera-captured image from the environment information analysis unit 106 as environment information when the self-position estimation unit 105 has executed self-position estimation.

Figure 8:
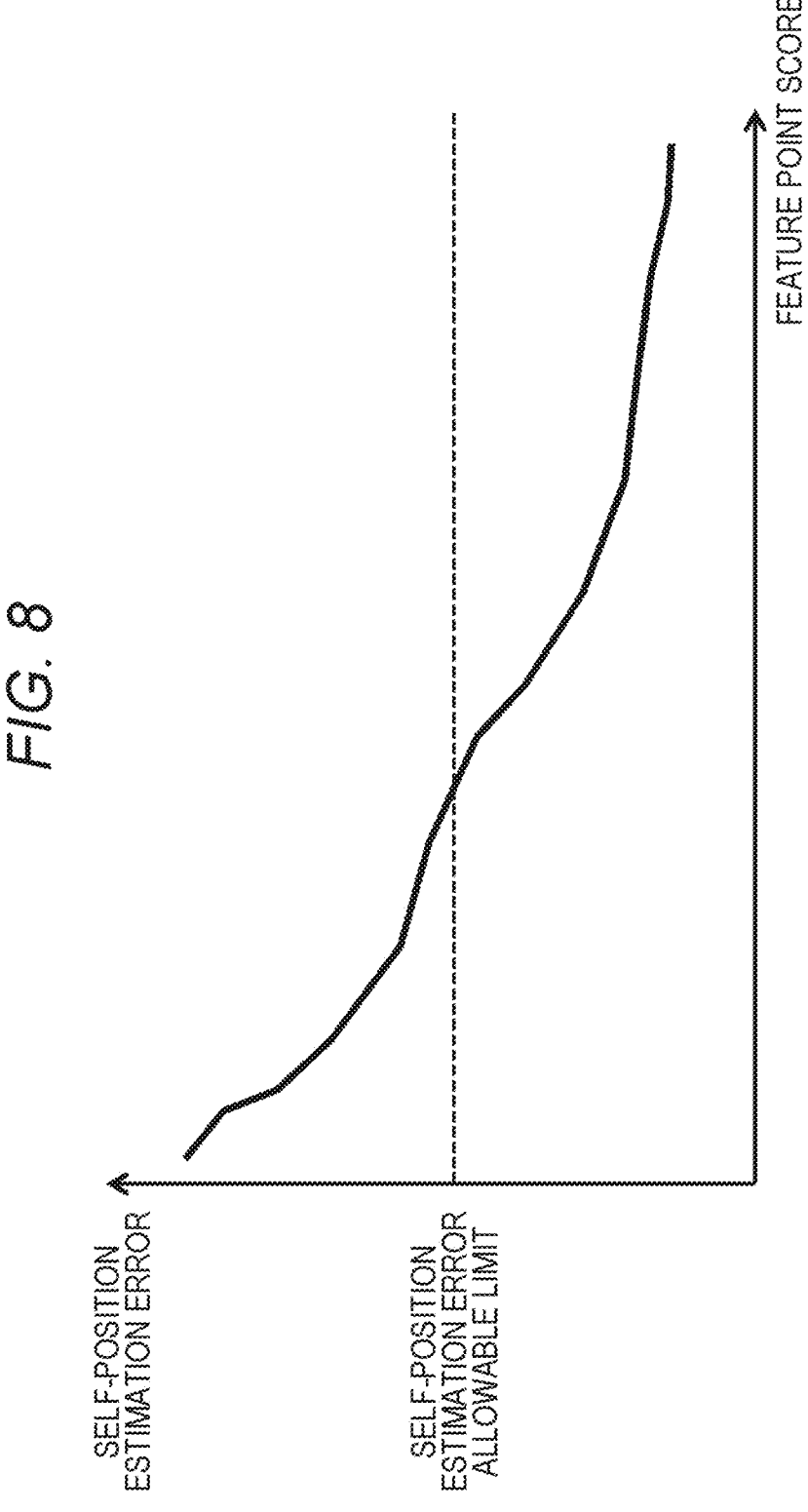
FIG. 8 is a diagram for describing a correspondence relationship between a feature point score and the self-position estimation error.

A graph illustrated in FIG. 8 is a graph in which a horizontal axis represents a feature point score and a vertical axis represents a self-position estimation error.

This graph is a graph generated in advance. For example, the graph is a graph generated by an experiment of self-position estimation accuracy.

As can be understood from the graph, the self-position estimation error decreases as the feature point score becomes higher, so that highly accurate self-position estimation becomes possible. On the other hand, the self-position estimation error increases as the feature point score becomes lower, so that the accuracy of the self-position estimation decreases.

Note that the feature point score referred to herein is a total value of scores of all feature points obtained from the camera-captured image.

The feature point score becomes higher as the number of feature points obtained from the camera-captured image is larger.

Furthermore, the feature point score becomes higher as a feature obtained from the camera-captured image has a higher predefined feature point evaluation index such as "noticeable" or "easily tracked".

As a result, a relationship between the "feature point score", which is the total value of the scores of all the feature points obtained from the camera-captured image, and the self-position estimation error is a relationship illustrated in a graph of FIG. 8.

Data corresponding to the graph illustrated in FIG. 8, that is, correspondence relationship data between the feature point score and the self-position estimation error is stored in the storage unit of the information processing apparatus 100, and the estimated self-position reliability calculation unit 107 calculates a reliability of a self-position estimated by the self-position estimation unit 105 using the correspondence relationship data (=the graph illustrated in FIG. 8) between the feature point score and the self-position estimation error.

In a specific reliability calculation process, for example, the reliability is calculated on the basis of the total value (feature point score) of the scores of all the feature points obtained from the image captured by the sensor (camera) 101.

Figure 9:
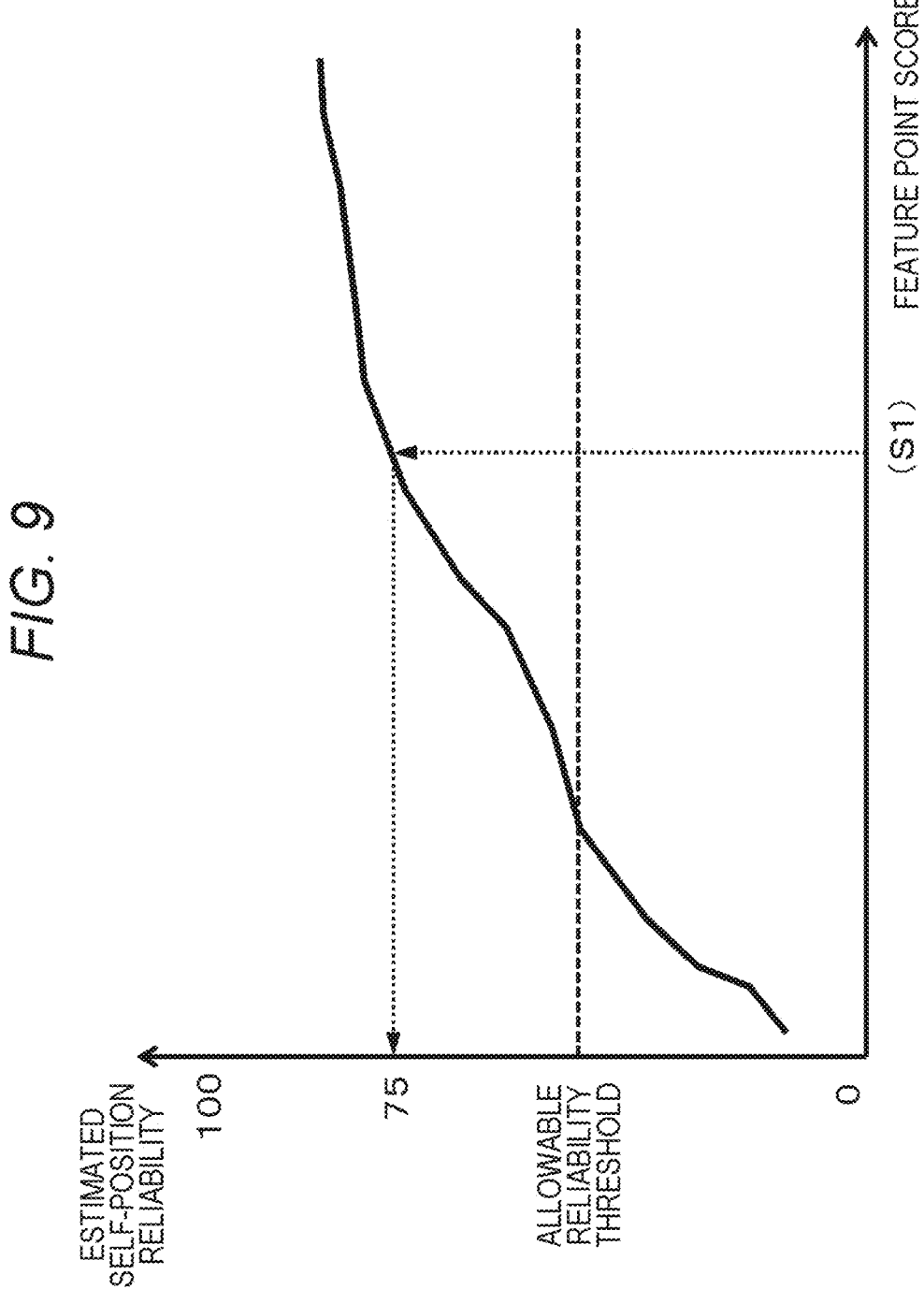
FIG. 9 is a diagram for describing a correspondence relationship between the feature point score and the estimated self-position reliability.

For example, a correspondence relationship between the total value (feature point score) of the scores of all the feature points obtained from the image captured by the sensor (camera) 101 and the reliability (0 to 100) of the self-position estimated by the self-position estimation unit 105 when the self-position estimation unit 105 has executed the self-position estimation is a graph illustrated in FIG. 9. Note that the example illustrated in FIG. 9 is an example in which the reliability is set to a value from the lowest reliability to the highest reliability as 0 to 100.

The graph illustrated in FIG. 9 is calculated from the graph of the correspondence relationship between the feature point score and the self-position estimation error illustrated in FIG. 8.

Specifically, the graph illustrated in FIG. 9 can be generated by vertically inverting the graph of the correspondence relationship between the feature point score and the self-position estimation error illustrated in FIG. 8.

The estimated self-position reliability calculation unit 107 calculates the reliability of the self-position estimated by the self-position estimation unit 105 using correspondence relationship data between the feature point score and the estimated self-position reliability illustrated in FIG. 9.

Specifically, for example, in a case where the total value (feature point score) of the scores of all the feature points obtained from the captured image captured by the sensor (camera) 101 is a luminance (S1) in the graph illustrated in FIG. 9 when the self-position estimation unit 105 has executed the self-position estimation, the reliability of the self-position estimated by the self-position estimation unit 105 is about 75. However, the reliability is set between the lowest reliability (0) to the highest reliability (100).

Next, a description will be given regarding processing in a case where the estimated self-position reliability calculation unit 107 receives an input of the following environment information of (c) number of static objects detected from camera-captured image or area occupancy of static objects in image from the environment information analysis unit 106 as environment information when the self-position estimation unit 105 has executed self-position estimation.

Figure 10:
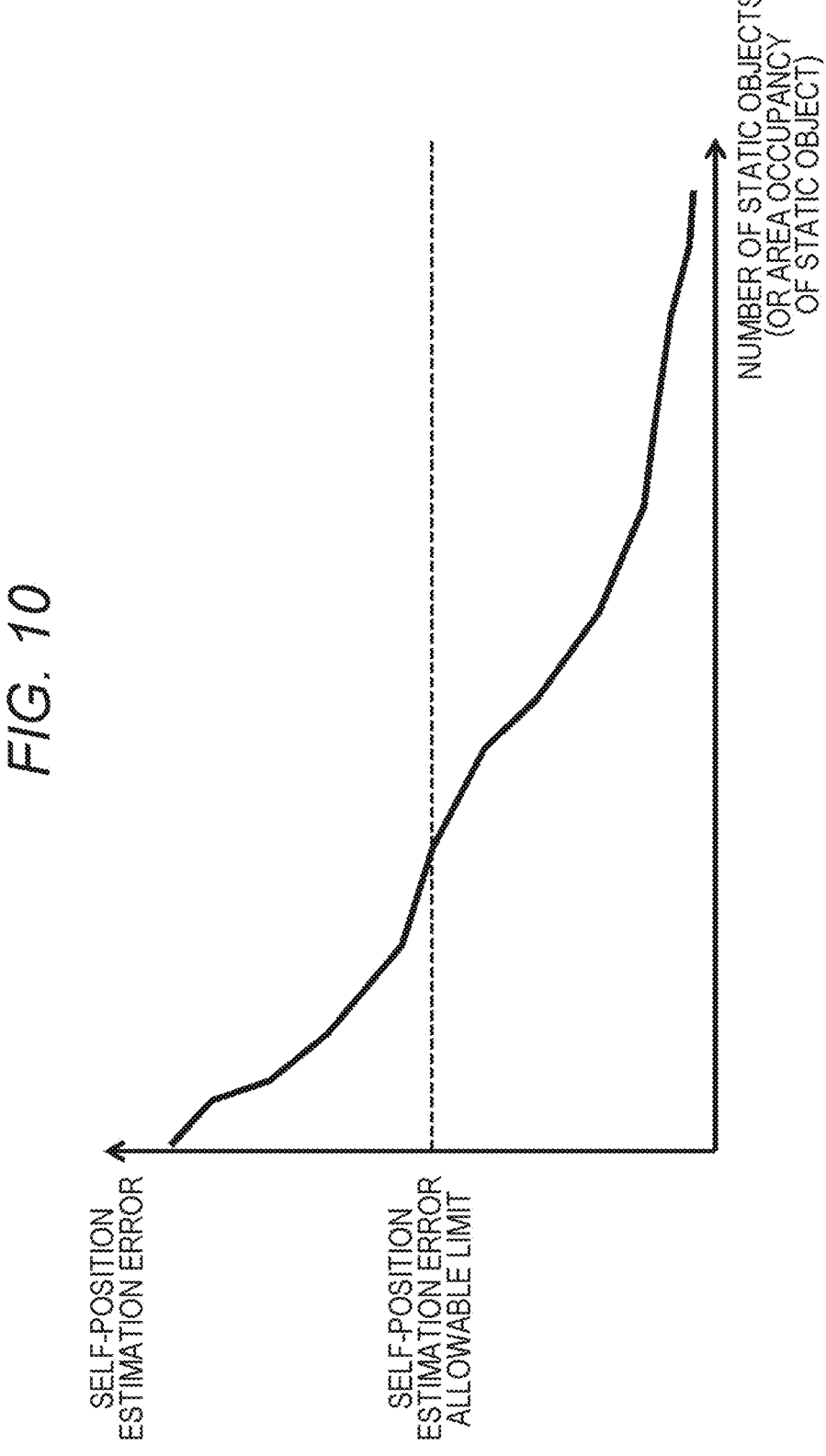
FIG. 10 is a diagram for describing a correspondence relationship between the number of static objects and the self-position estimation error.

A graph illustrated in FIG. 10 is a graph in which a horizontal axis represents the number of static objects or area occupancy of static objects in an image and the vertical axis represents a self-position estimation error.

This graph is a graph generated in advance. For example, the graph is a graph generated by an experiment of self-position estimation accuracy.

As can be understood from the graph, the self-position estimation error decreases as the number of static objects or area occupancy of static objects in the image increases, so that highly accurate self-position estimation becomes possible. On the other hand, the self-position estimation error increases as the number of static objects or area occupancy of static objects in the image decreases, so that the accuracy of the self-position estimation decreases.

Note that the number of static objects referred to herein is a total number of all static objects obtained from the camera-captured image.

Data corresponding to the graph illustrated in FIG. 10, that is, correspondence relationship data between the number of static objects or area occupancy of static objects in the image and the self-position estimation error is stored in the storage unit of the information processing apparatus 100, and the estimated self-position reliability calculation unit 107 calculates a reliability of a self-position estimated by the self-position estimation unit 105 using the correspondence relationship data (=the graph illustrated in FIG. 10) between the number of static objects or area occupancy of static objects in the image and the self-position estimation error.

In a specific reliability calculation process, for example, the reliability is calculated on the basis of the number of static objects obtained from the image captured by the sensor (camera) 101 or the area occupancy of static objects in the image.

Figure 11:
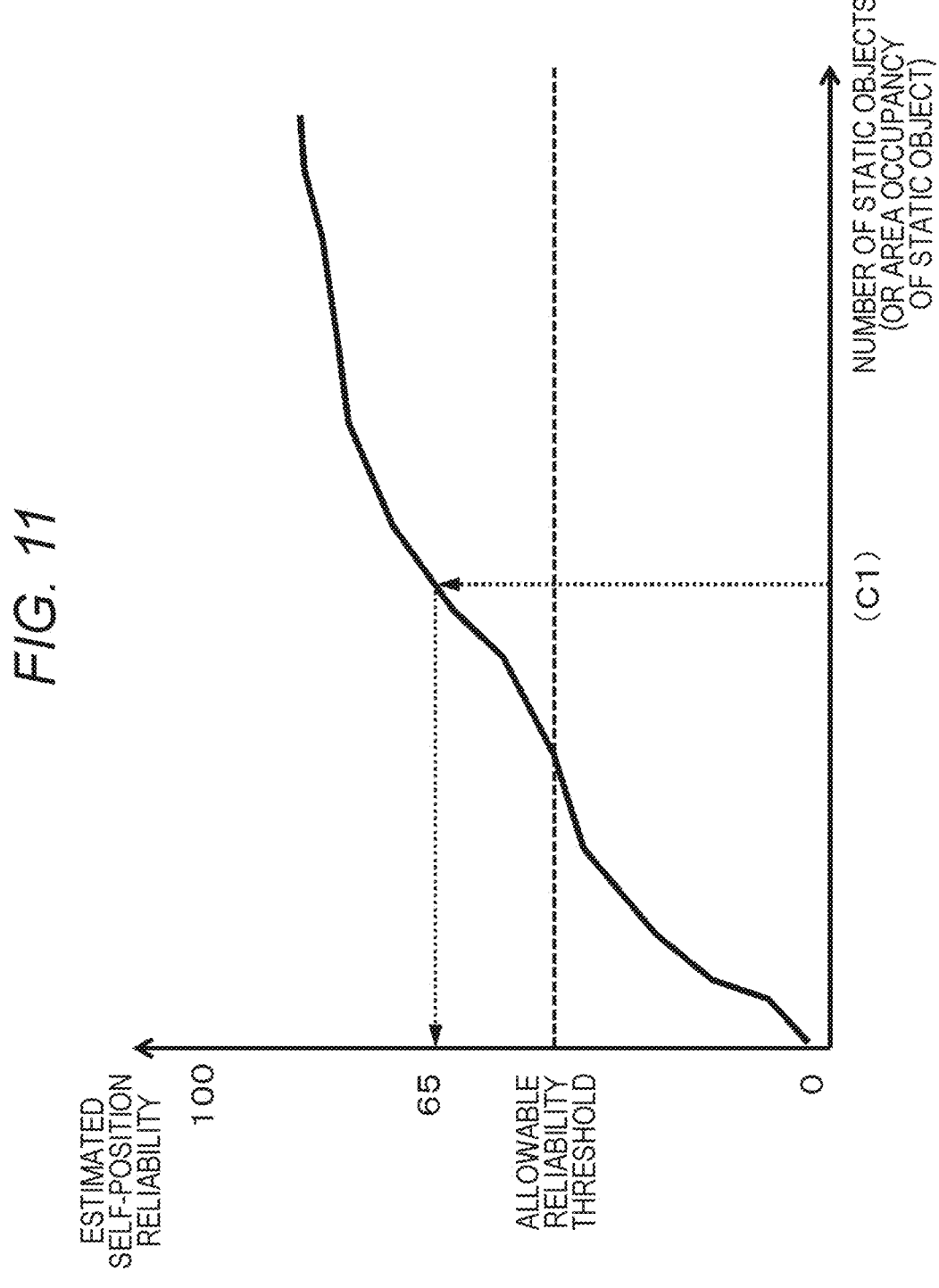
FIG. 11 is a diagram for describing a correspondence relationship of the number of static objects.

For example, a correspondence relationship between the number of static objects obtained from the image captured by the sensor (camera) 101 or the area occupancy of static objects in the image and the reliability (0 to 100) of the self-position estimated by the self-position estimation unit 105 when the self-position estimation unit 105 has executed the self-position estimation is a graph illustrated in FIG. 11. Note that the example illustrated in FIG. 11 is an example in which the reliability is set to a value from the lowest reliability to the highest reliability as 0 to 100.

The graph illustrated in FIG. 11 is calculated from the graph of the correspondence relationship between the number of static objects or area occupancy of static objects in the image and the self-position estimation error illustrated in FIG. 10.

Specifically, the graph illustrated in FIG. 11 can be generated by vertically inverting the graph of the correspondence relationship between the number of static objects or area occupancy of static objects in the image and the self-position estimation error illustrated in FIG. 10.

The estimated self-position reliability calculation unit 107 calculates the reliability of the self-position estimated by the self-position estimation unit 105 using correspondence relationship data between the number of static objects or area occupancy of static objects in the image and the estimated self-position reliability illustrated in FIG. 11.

Specifically, for example, in a case where the number of all static objects obtained from the captured image captured by the sensor (camera) 101 or the area occupancy of the static objects in the image when the self-position estimation unit 105 has executed the self-position estimation is the number of static objects or area occupancy of static objects in the image (C1) in the graph illustrated in FIG. 11, the reliability of the self-position estimated by the self-position estimation unit 105 is about 65. However, the reliability is set between the lowest reliability (0) to the highest reliability (100).

Next, a description will be given regarding processing in a case where the estimated self-position reliability calculation unit 107 receives an input of the following environment information of (d) number of GPS satellites from which GPS signals can be received from the environment information analysis unit 106 as environment information when the self-position estimation unit 105 has executed self-position estimation.

Figure 12:
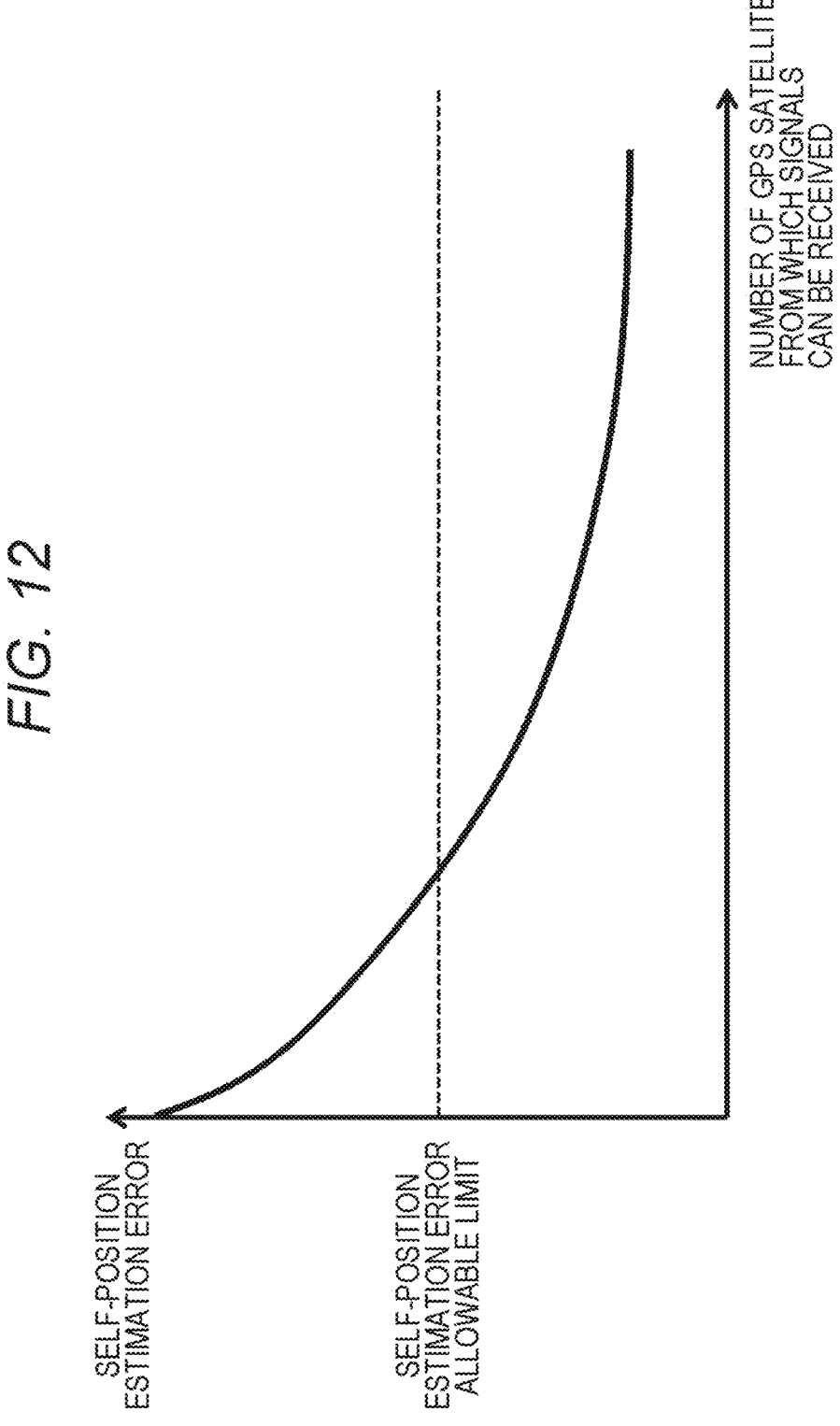
FIG. 12 is a diagram for describing a correspondence relationship between the number of GPS satellites from which signals can be received and the self-position estimation error.

A graph illustrated in FIG. 12 is a graph in which a horizontal axis represents the number of GPSs from which signals can be received and a vertical axis represents a self-position estimation error.

This graph is a graph generated in advance. For example, the graph is a graph generated by machine learning processing.

As can be understood from the graph, the self-position estimation error decreases as the number of GPSs from which signals can be received becomes larger, so that highly accurate self-position estimation becomes possible. On the other hand, the self-position estimation error increases as the number of GPSs from which signals can be received becomes smaller, so that the accuracy of the self-position estimation decreases.

Note that the number of GPSs from which signals can be received referred to herein is the number of GPS satellites from which signals can be received by the sensor (GPS) 103.

Data corresponding to the graph illustrated in FIG. 12, that is, correspondence relationship data between the number of GPSs from which signals can be received and the self-position estimation error is stored in the storage unit of the information processing apparatus 100, and the estimated self-position reliability calculation unit 107 calculates a reliability of a self-position estimated by the self-position estimation unit 105 using the correspondence relationship data (=the graph illustrated in FIG. 12) between the number of GPSs from which signals can be received and the self-position estimation error.

Figure 13:
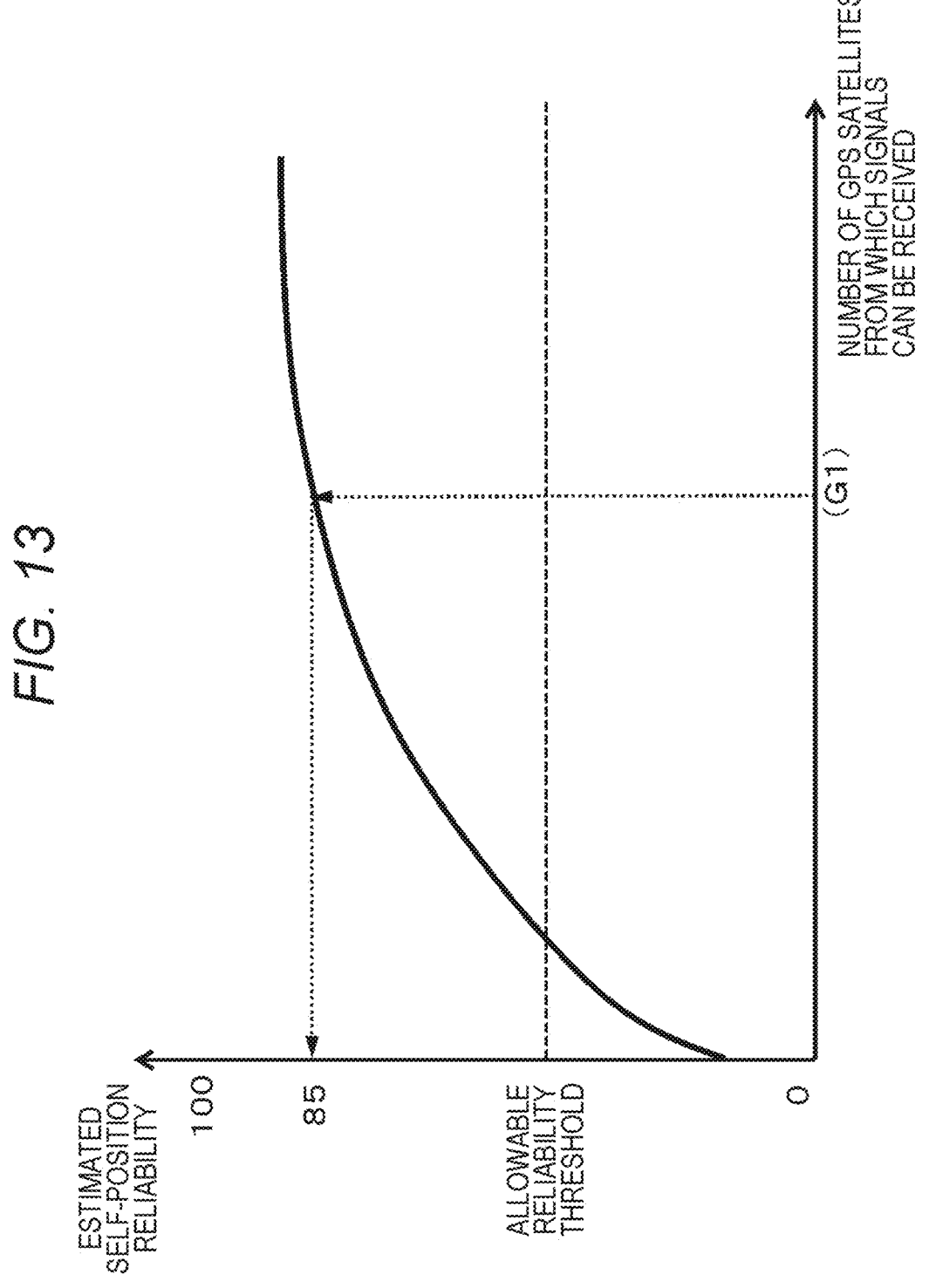
FIG. 13 is a diagram for describing a correspondence relationship between the number of GPS satellites from which signals can be received and the estimated self-position reliability.

For example, a correspondence relationship between the number of GPS satellites from which signals have been received by the sensor (GPS) 103 and the reliability (0 to 100) of the self-position estimated by the self-position estimation unit 105 when the self-position estimation unit 105 has executed the self-position estimation is a graph illustrated in FIG. 13. Note that the example illustrated in FIG. 13 is an example in which the reliability is set to a value from the lowest reliability to the highest reliability as 0 to 100.

The graph illustrated in FIG. 13 is calculated from the graph of the correspondence relationship between the number of GPSs from which signals can be received and the self-position estimation error illustrated in FIG. 12.

Specifically, the graph illustrated in FIG. 13 can be generated by vertically inverting the graph of the correspondence relationship between the number of GPSs from which signals can be received and the self-position estimation error illustrated in FIG. 12.

The estimated self-position reliability calculation unit 107 calculates the reliability of the self-position estimated by the self-position estimation unit 105 using correspondence relationship data between the number of GPSs from which signals can be received and the estimated self-position reliability illustrated in FIG. 13.

Specifically, for example, in a case where the number of all GPSs from which signals can be received obtained from a captured image captured by the sensor (camera) 101 when the self-position estimation unit 105 has executed the self-position estimation is the number of GPSs from which signals can be received (G1) in the graph illustrated in FIG. 13, the reliability of the self-position estimated by the self-position estimation unit 105 is about 85. However, the reliability is set between the lowest reliability (0) to the highest reliability (100).

The description has been given so far regarding the reliability calculation process in the case where the estimated self-position reliability calculation unit 107 receives the input of one of the following environment information:

(a) ambient brightness;

(b) score of feature point detected from camera-captured image;

(c) number of static objects detected from camera-captured image or area occupancy of static objects in image; and (d) number of GPS satellites from which GPS signals can be received, from the environment information analysis unit 106 as the environment information when the self-position estimation unit 105 has executed the self-position estimation, that is, examples of the process of calculating the reliability of the self-position estimated by the self-position estimation unit 105.

There is also a case where the estimated self-position reliability calculation unit 107 receives inputs of all or a plurality of the following pieces of environment information in (a) to (d):

(a) ambient brightness;

(b) score of feature point detected from camera-captured image;

(c) number of static objects detected from camera-captured image or area occupancy of static objects in image; and (d) number of GPS satellites from which GPS signals can be received, from the environment information analysis unit 106 as the environment information when the self-position estimation unit 105 has executed the self-position estimation.

In this case, reliabilities calculated on the basis of individual pieces of the environment information are weighted and added to calculate a final reliability.

For example, it is assumed that environmental information=estimated self-position reliability calculated on basis of "(a) ambient brightness"=V1, environment information=estimated self-position reliability calculated on basis of "(b) score of feature point detected from camera-captured image"=V2, environmental information=estimated self-position reliability calculated on basis of "(c) number of static objects detected from camera-captured image or area occupancy of static objects in image"=V3, and environmental information=estimated self-position reliability calculated on basis of "(d) number of GPS satellites from which GPS signals can be received"=V4.

In this case, the estimated self-position reliability calculation unit 107 calculates the final reliability, that is, the reliability of the self-position estimated by the self-position estimation unit 105 according to the following formula using predefined weighting coefficients $\alpha1$ to $\alpha4$ for the individual reliabilities V1, V2, V3, and V4 calculated on the basis of the above-described four types of environment information.

$$\text{Reliability}=(\alpha1 \times V1)+(\alpha2 \times V2)+(\alpha3 \times V3)+(\alpha4 \times V4)$$

The estimated self-position reliability calculation unit 107 calculates the reliability of the self-position estimated by the self-position estimation unit 105, for example, according to the above-described formula.

Note that the weighting coefficients $\alpha1$ to $\alpha4$ are determined in accordance with, for example, the range of reliability (for example, 0 to 100) calculated according to the above-described formula.

Note that, for example, in a case where only V1 and V2 can be obtained as the individual reliabilities calculated on the basis of the above-described four types of environment information, the final reliability, that is, the reliability of the self-position estimated by the self-position estimation unit 105 is calculated according to the following formula using predefined weighting coefficients $\beta1$ and $\beta2$.

$$\text{Reliability}=(\beta1 \times V1)+(\beta2 \times V2)$$

In this manner, the estimated self-position reliability calculation unit 107 sets optimum weighting coefficient in accordance with the number of pieces and types of environmental information among the four types of environmental information and performs the reliability calculation process.

As described above, the estimated self-position reliability calculation unit 107 calculates the reliability of the estimated self-position on the basis of the environment information analyzed by the environment information analysis unit 106, that is, the environment information when the self-position estimation unit 105 has executed the self-position estimation.

Moreover, the estimated self-position reliability calculation unit 107 compares the calculated reliability of the estimated self-position with a predefined threshold, for example, an "allowable reliability threshold" illustrated in FIG. 7, 9, 11, or 13, and displays a warning on the information display unit 121 of a controller held by a control center or a user (pilot) in a case where the calculated reliability of the estimated self-position is less than the "allowable reliability threshold".

Figure 14:
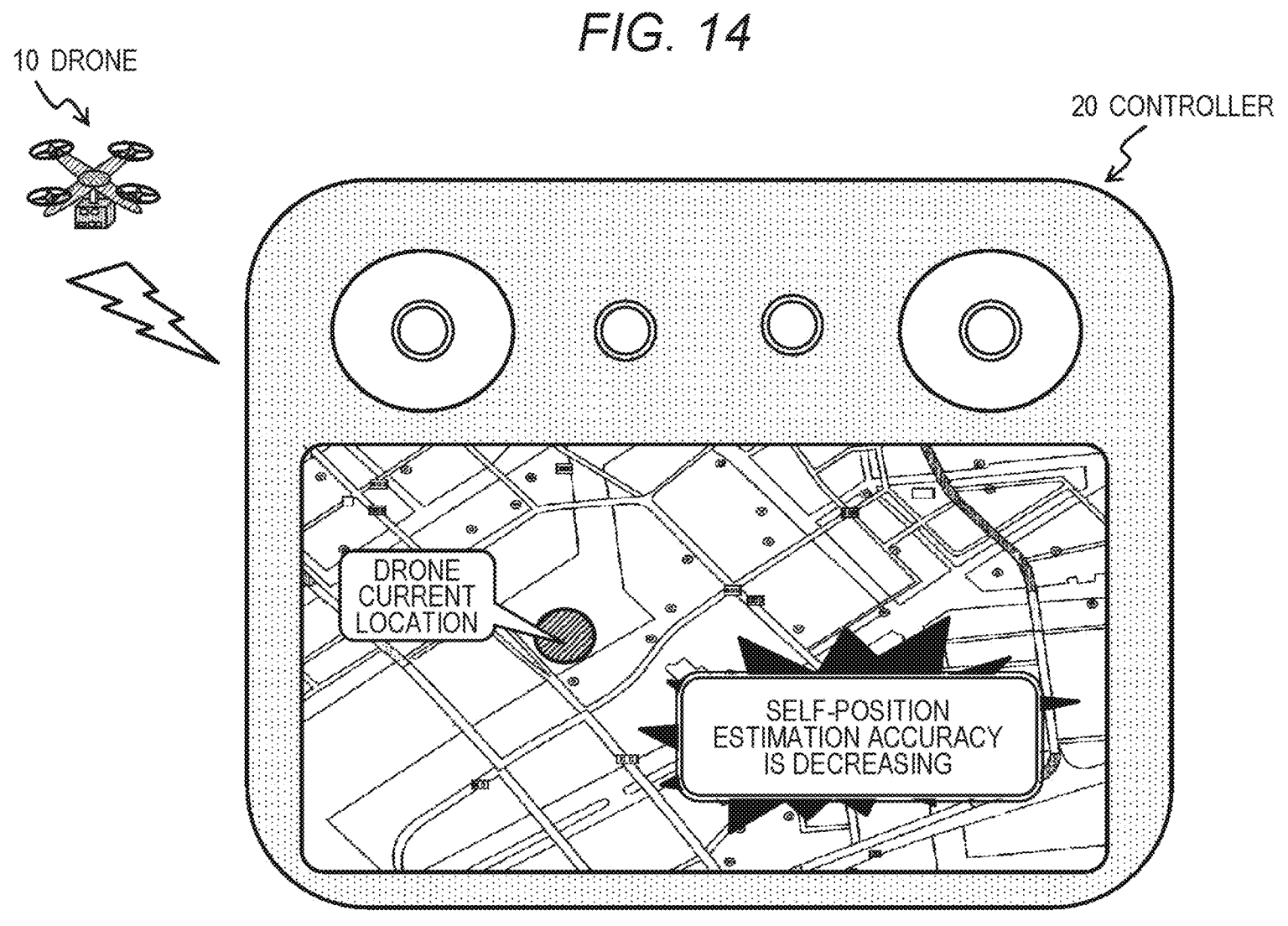

For example, the warning display as illustrated in FIG. 14 is executed.

Figure 15:
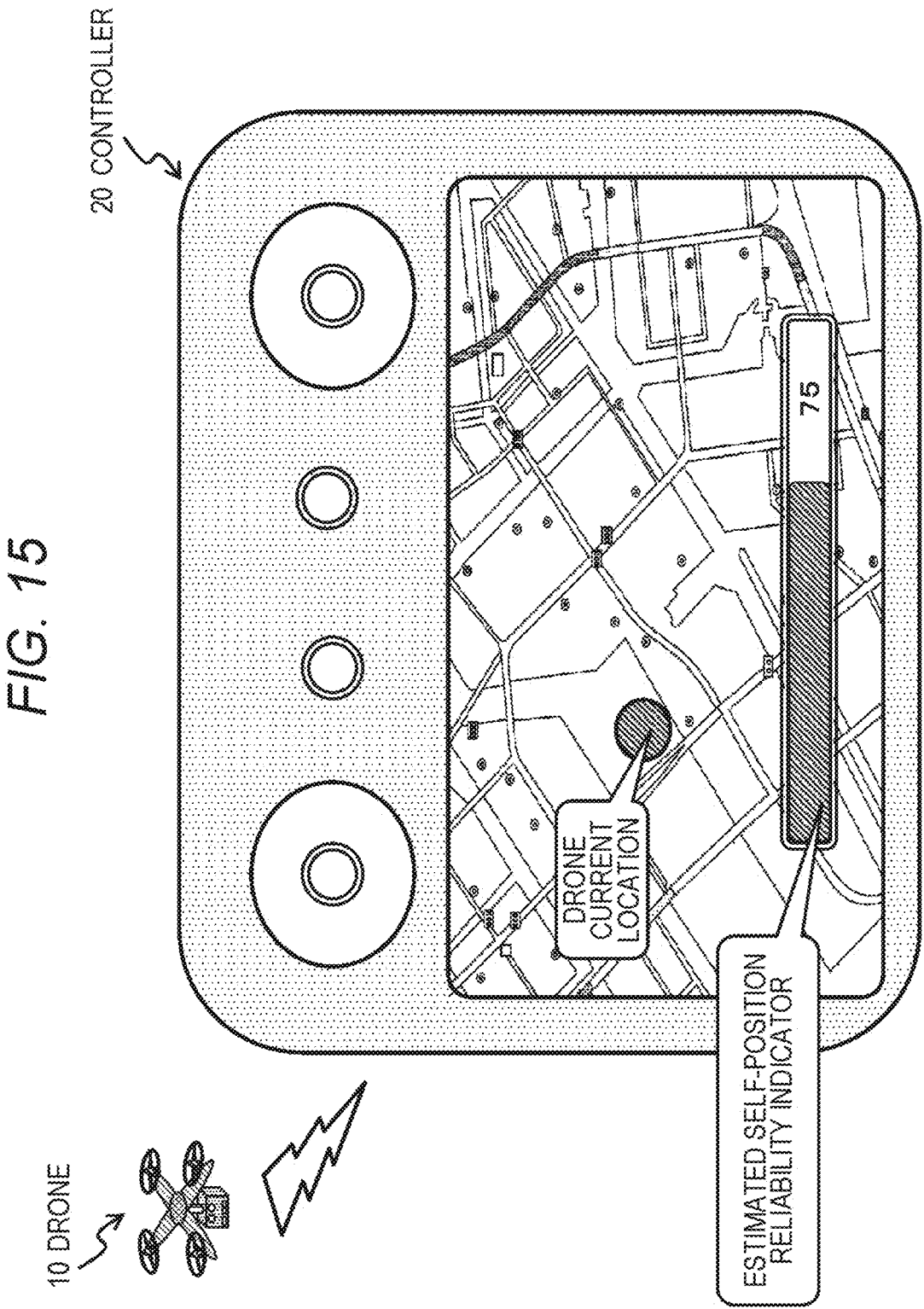
FIG. 15 is a diagram for describing an information display example on the information display unit.

Moreover, a configuration may be adopted in which an estimated self-position reliability indicator is displayed to indicate the reliability calculated by the estimated self-position reliability calculation unit 107 as illustrated in FIG. 15.

Figure 16:
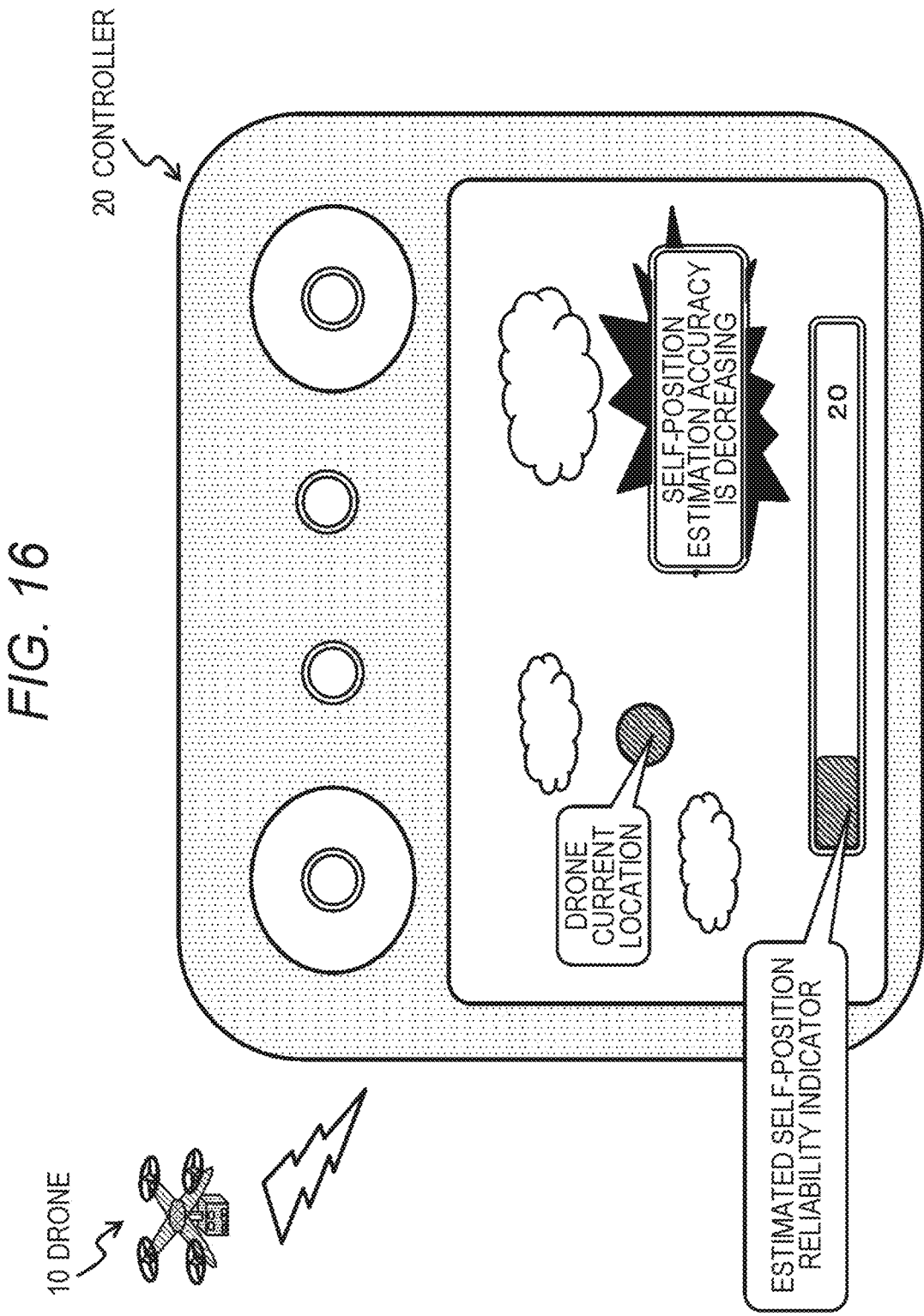
FIG. 16 is a diagram for describing an information display example on the information display unit.

For example, in a state in which the drone 10 can capture only an image of the sky as a camera-captured image as illustrated in FIG. 16, it is difficult to extract a feature point from the captured image, and thus, it is difficult to execute the self-position estimation, and as a result, the self-position estimation accuracy decreases.

Moreover, in a case where the calculated reliability of the estimated self-position is less than the prescribed threshold, for example, the "allowable reliability threshold" illustrated in FIG. 7, 9, 11, or 13, the estimated self-position reliability calculation unit 107 outputs a flight control instruction to the mobile body control unit 108 to change a flight route of a mobile body.

For example, route determination is performed by searching for a route in which the reliability of the estimated self-position becomes high while avoiding a route in which the reliability of the estimated self-position is low.

Specifically, for example, a route with few concept buildings of plots in which signals from GPS satellites are easily received is selected. Note that map information can be received from the storage unit of the information processing apparatus or an external server.

Furthermore, the estimated self-position reliability calculation unit 107 verifies changes in the reliabilities sequentially calculated according to the flight route of the drone, estimates a direction in which the reliability decreases or a direction in which the reliability increases, and outputs a flight instruction to select the direction in which the reliability increases as the travel route to the mobile body control unit 108.

Figure 17:
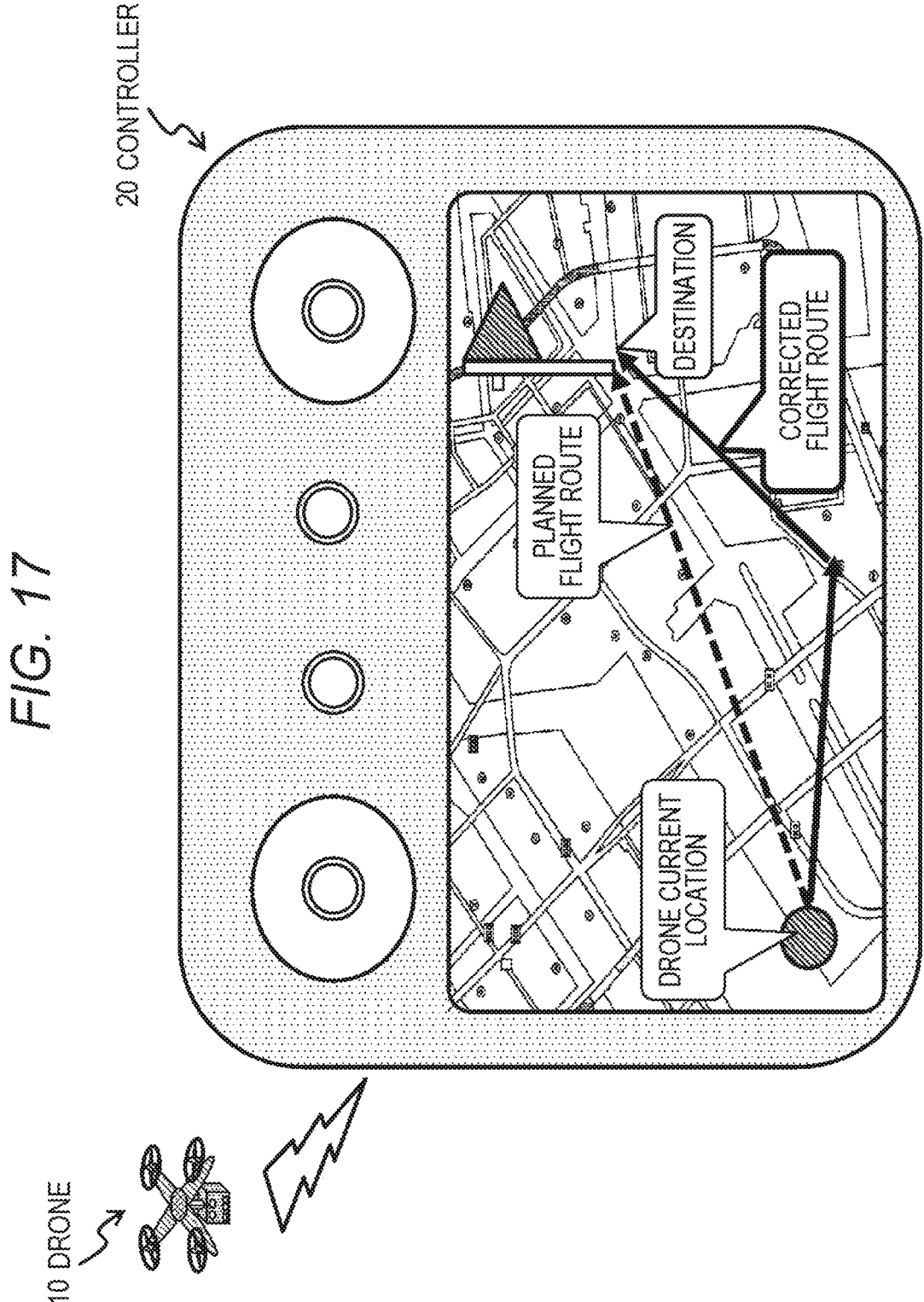
FIG. 17 is a diagram for describing an information display example on the information display unit.

Note that in a case where the flight route has been corrected, display data indicating the corrected flight route is output to the information display unit 121, for example, as illustrated in FIG. 17.

Moreover, the estimated self-position reliability calculation unit 107 may be configured to output sensing direction control information for controlling sensing directions of the sensors 101 to 103 to the sensors.

That is, control is performed such that a capturing direction of the camera is changed so as to capture an image having many feature points in order to improve the accuracy of self-position estimation.

Note that, as described above, the estimated self-position reliability calculation unit 107 receives inputs of the following pieces of environment information in (a) to (d):

(a) ambient brightness;

(b) score of feature point detected from camera-captured image;

(c) number of static objects detected from camera-captured image or area occupancy of static objects in image; and (d) number of GPS satellites from which GPS signals can be received, from the environment information analysis unit 106 as the environment information when the self-position estimation unit 105 has executed the self-position estimation, and calculates the reliability corresponding to each piece of the environmental information.

In this case, for example, it is also possible to determine that sufficiently high self-position estimation is possible on the basis of a GPS signal. In such a case, a process of turning off switches of the other sensors (camera and LiDAR) to save power may be performed.

[3. Regarding Sequence of Processing Executed by Information Processing Apparatus of Present Disclosure]

Next, a sequence of processing executed by the information processing apparatus of the present disclosure will be described.

The sequence of the processing executed by the information processing apparatus of the present disclosure will be described with reference to a flowchart illustrated in FIG. 18.

Figure 18:
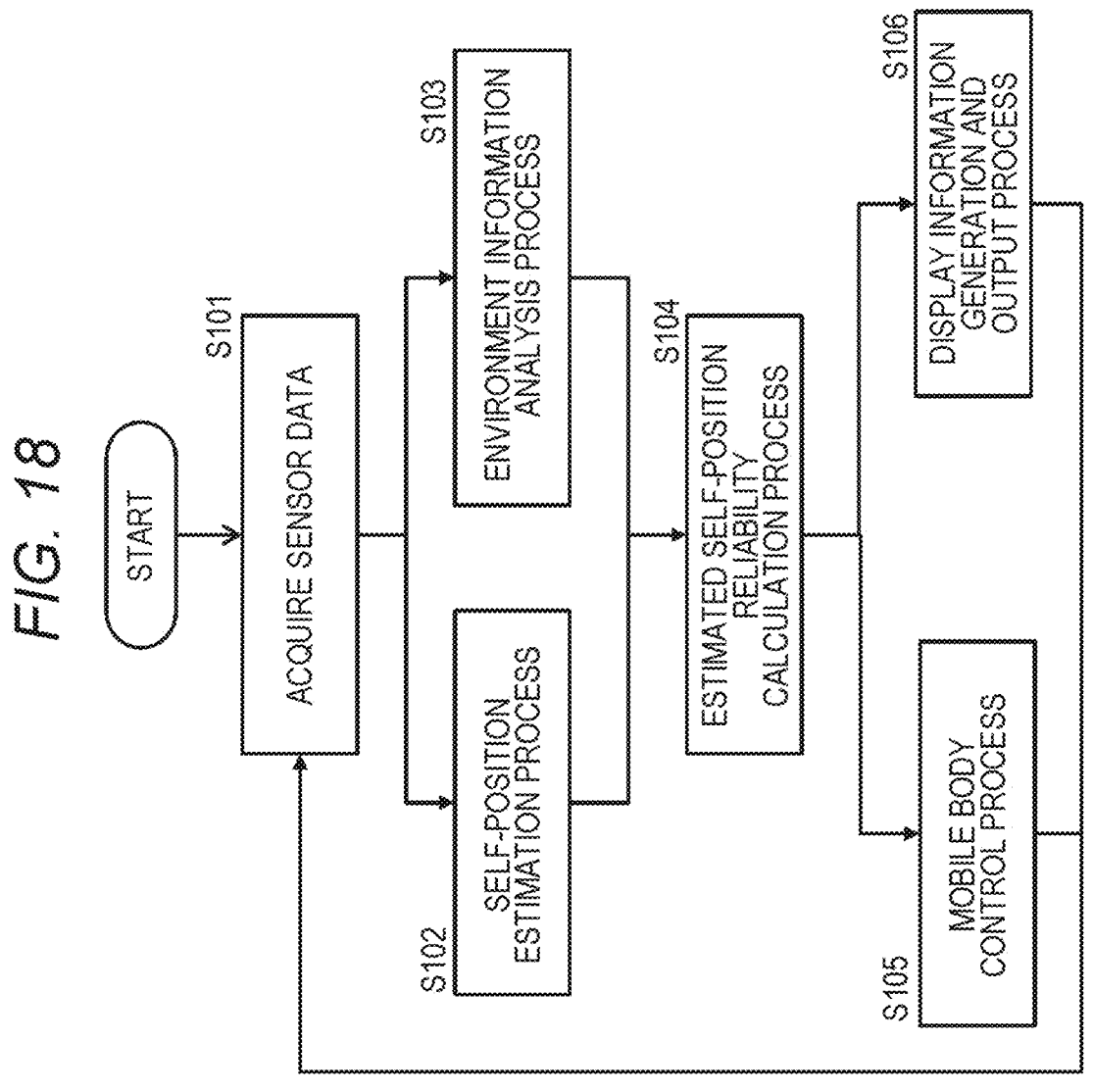
FIG. 18 is a flowchart for describing a sequence of processing executed by the information processing apparatus.

Note that processing according to the flowchart in FIG. 18 is processing that can be executed under the control of a control unit (data processing unit), which includes a CPU having a program execution function of the information processing apparatus and the like, according to a program stored in a memory inside the information processing apparatus.

Hereinafter, a process in each step of the flow illustrated in FIG. 18 and the subsequent drawings will be described.

(Step S101)

First, the information processing apparatus 100 mounted on the drone 10 acquires sensor data in step S101.

This process is a process executed by the sensor data acquisition unit 104 of the information processing apparatus 100 illustrated in FIG. 2.

As described with reference to FIG. 2, various sensors such as a camera, a LiDAR, and a GPS are mounted on the drone, and the sensor data acquisition unit 104 receives inputs of various pieces of sensor detection information thereof.

(Step S102)

Note that a process of S102 and a process of step S103 are processes that can be executed in parallel.

In step S102, the information processing apparatus 100 executes a self-position estimation process.

This process is a process executed by the self-position estimation unit 105 of the information processing apparatus 100 illustrated in FIG. 2.

The self-position estimation process is executed by, for example, a process using GPS position information which is the sensor acquisition information, a simultaneous localization and mapping (SLAM) process using a captured image of the camera constituting the sensors, or the like.

The SLAM process is a process of capturing images (a moving image) by a camera, analyzing a trajectory of a feature point included in the plurality of captured images to estimate a three-dimensional position of the feature point and estimating (localizing) (self) position and attitude of the camera, and can create (map) a surrounding map (environmental map) using information of the feature point. In this manner, the process of executing the (self) position identification (localization) of the camera and the creation (mapping) of the surrounding map (environmental map) in parallel is called SLAM.

(Step S103)

Moreover, in step S103, the information processing apparatus 100 analyzes external environment information on the basis of the sensor acquisition information.

This process is a process executed by the environment information analysis unit 106 of the information processing apparatus 100 illustrated in FIG. 2.

The environment information analysis unit 106 receives the input of the sensor detection information acquired by the sensor data acquisition unit 104, and analyzes information regarding an environment in which the self-position estimation process has been executed on the basis of the input sensor detection information.

Specifically, as described above, regarding the environment at the time of executing the self-position estimation process, for example, the following pieces of environment information are analyzed:

(a) ambient brightness;

(b) score of feature point detected from camera-captured image;

(c) number of static objects detected from camera-captured image or area occupancy of static objects in image; and (d) number of GPS satellites from which GPS signals can be received.

(Step S104)

Next, in step S104, the information processing apparatus 100 executes an estimated self-position reliability calculation process.

This process is a process executed by the estimated self-position reliability calculation unit 107 of the information processing apparatus 100 illustrated in FIG. 2.

The estimated self-position reliability calculation unit 107 calculates a reliability of a self-position estimated by the self-position estimation unit 105 on the basis of the environment information analyzed by the environment information analysis unit 106, that is, the environment information when the self-position estimation unit 105 has executed the self-position estimation.

This process corresponds to the process described above with reference to the graphs of FIGS. 6 to 13.

For example, the estimated self-position reliability calculation unit 107 calculates a final reliability, that is, the reliability of the self-position estimated by the self-position estimation unit 105 according to the following formula using predefined weighting coefficients α1 to α4 for individual reliabilities V1, V2, V3, and V4 calculated on the basis of the above-described four types of environment information.

$$\text{Reliability}=(\alpha 1 \times V1)+(\alpha 2 \times V2)+(\alpha 3 \times V3)+(\alpha 4 \times V4)$$

The estimated self-position reliability calculation unit 107 calculates the reliability of the self-position estimated by the self-position estimation unit 105, for example, according to the above-described formula.

(Step S105)

Note that a process of S105 and a process of step S106 are processes that can be executed in parallel.

In step S105, the information processing apparatus 100 controls a mobile body (the drone 10).

This process is a process executed by the mobile body control unit 108 of the information processing apparatus 100 illustrated in FIG. 2.

In a case where the calculated reliability of the estimated self-position is less than a prescribed threshold, for example, the "allowable reliability threshold" illustrated in FIG. 7, 9, 11, or 13, the estimated self-position reliability calculation unit 107 outputs a flight control instruction to the mobile body control unit 108 to change a flight route of the mobile body.

The mobile body control unit 108 controls the mobile body (drone 10) according to the instruction of the estimated self-position reliability calculation unit 107.

For example, route determination is performed by searching for a route in which the reliability of the estimated self-position becomes high while avoiding a route in which the reliability of the estimated self-position is low.

Specifically, for example, a route with few concept buildings of plots in which signals from GPS satellites are easily received is selected. Note that map information can be received from the storage unit of the information processing apparatus or an external server.

(Step S106)

Moreover, in step S106, the information processing apparatus 100 generates display information and performs an information output process with respect to a display unit.

This process is an information display process using the information display unit 121 illustrated in FIG. 2.

The estimated self-position reliability calculation unit 107 compares the calculated reliability of the estimated self-position with the predefined threshold, for example, the "allowable reliability threshold" illustrated in FIG. 7, 9, 11, or 13, and displays a warning on the information display unit 121 of a controller held by a control center or a user (pilot) in a case where the calculated reliability of the estimated self-position is less than the "allowable reliability threshold".

For example, the warning display as illustrated in FIG. 14 is executed.

Moreover, a configuration may be adopted in which an estimated self-position reliability indicator is displayed to indicate the reliability calculated by the estimated self-position reliability calculation unit 107 as illustrated in FIG. 15.

[4. Regarding Configuration for Performing Drone Control from Outside]

Next, a configuration for performing drone control from the outside will be described as a modified example.

For example, in a configuration in which a piloting signal can be directly transmitted from a controller of a control center or a user (pilot) to the drone 10 to control a movement route of the drone 10, a control signal can be transmitted from the controller of the control center or the user (pilot) to the drone 10 to change a flight route and the like as necessary.

For example, it is possible to adopt a configuration in which an air traffic controller or the user (pilot) who has viewed the warning display described above with reference to FIGS. 14 to 16 selects an optimal flight route and outputs a control signal to the drone 10.

Such a configuration example will be described with reference to FIG. 19.

Figure 19:
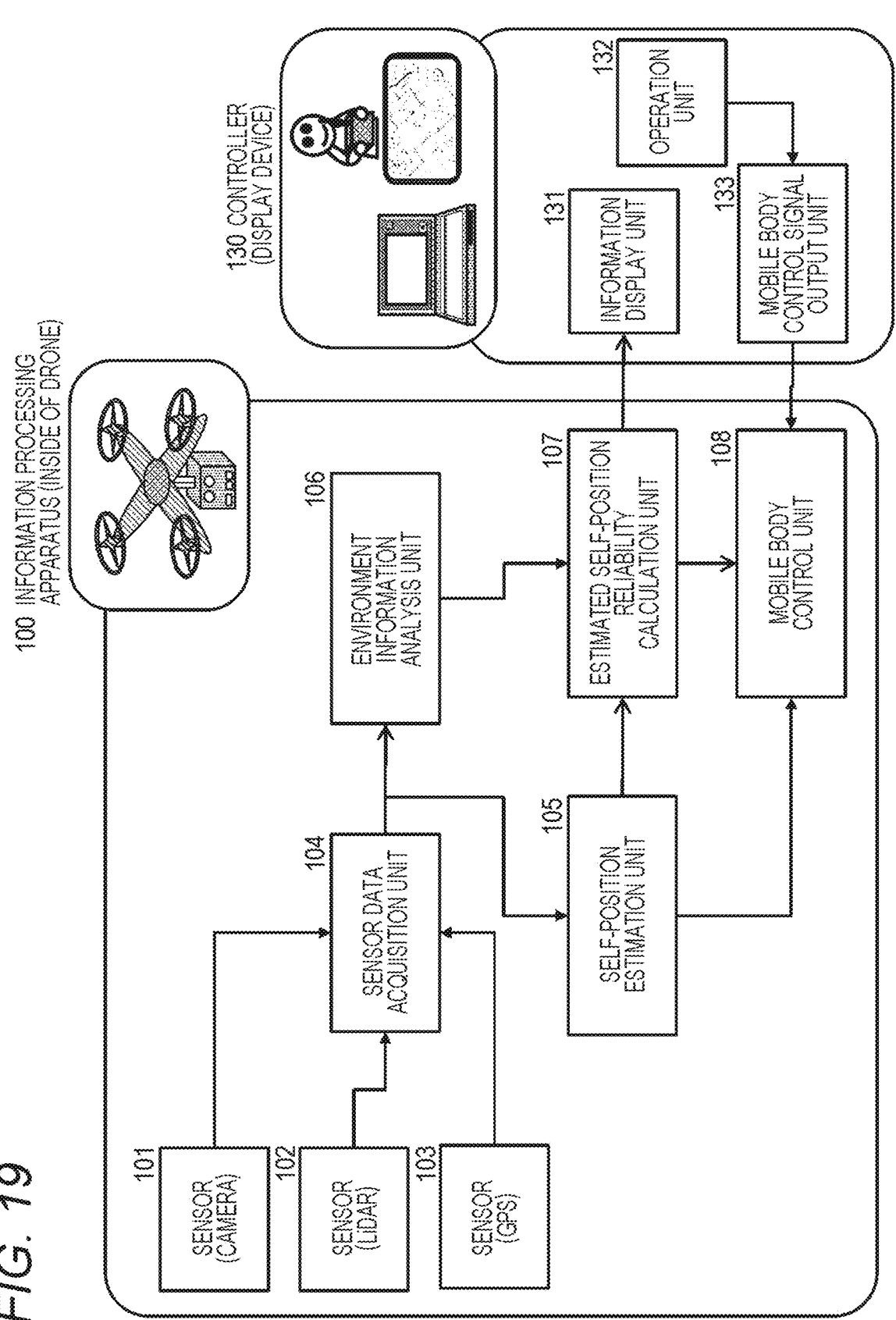
FIG. 19 is a diagram for describing a configuration example of an information processing system of the present disclosure.

FIG. 19 illustrates the information processing apparatus 100 mounted on the drone 10 and a controller 130 that can communicate with the information processing apparatus 100.

The controller 130 is the controller provided in the control center or owned by the user (pilot).

The configuration of the information processing apparatus 100 is a configuration similar to the configuration described above with reference to FIG. 2.

That is, the information processing apparatus 100 includes the sensor (camera) 101, the sensor (LiDAR) 102, the sensor (GPS) 103, the sensor data acquisition unit 104, the self-position estimation unit 105, the environment information analysis unit 106, the estimated self-position reliability calculation unit 107, and the mobile body control unit 108.

On the other hand, the controller 130 includes an operation unit 132 and a mobile body control signal output unit 133 in addition to an information display unit 131.

For example, display data as illustrated in FIGS. 14 to 17 described above is displayed on the information display unit 131.

The estimated self-position reliability calculation unit 107 of the information processing apparatus 100 in the drone 10 compares a calculated reliability of an estimated self-position with a predefined threshold, for example, the "allowable reliability threshold" illustrated in FIG. 7, 9, 11, or 13, and displays a warning on the information display unit 131 of the controller 130 held by the control center or the user (pilot) in a case where the calculated reliability of the estimated self-position is less than the "allowable reliability threshold".

For example, the warning display as illustrated in FIG. 14 is executed.

Moreover, an estimated self-position reliability indicator is displayed to output the reliability calculated by the estimated self-position reliability calculation unit 107 as illustrated in FIGS. 15 and 16.

For example, the air traffic controller or the user (pilot) viewing the warning display on the controller 130 side of the control center or the user (pilot) inputs an optimum flight route, for example, via the operation unit 132. Moreover, the mobile body control signal output unit 133 transmits a control signal for performing flight according to the flight route selected by the operation unit 132 to the mobile body control unit 108 of the information processing apparatus 100 of the drone 10.

The mobile body control unit 108 controls the flight of the drone 10 on the basis of the signal received from the controller 130.

[5. Regarding Hardware Configuration Example of Information Processing Apparatus]

Next, a hardware configuration example of an information processing apparatus will be described.

Note that the information processing apparatus of the present disclosure includes not only an information processing apparatus mounted on a drone, that is, the information processing apparatus 100 having the configuration illustrated in FIGS. 2 and 19, but also the controller 130, for example, illustrated in FIG. 19.

Figure 20:
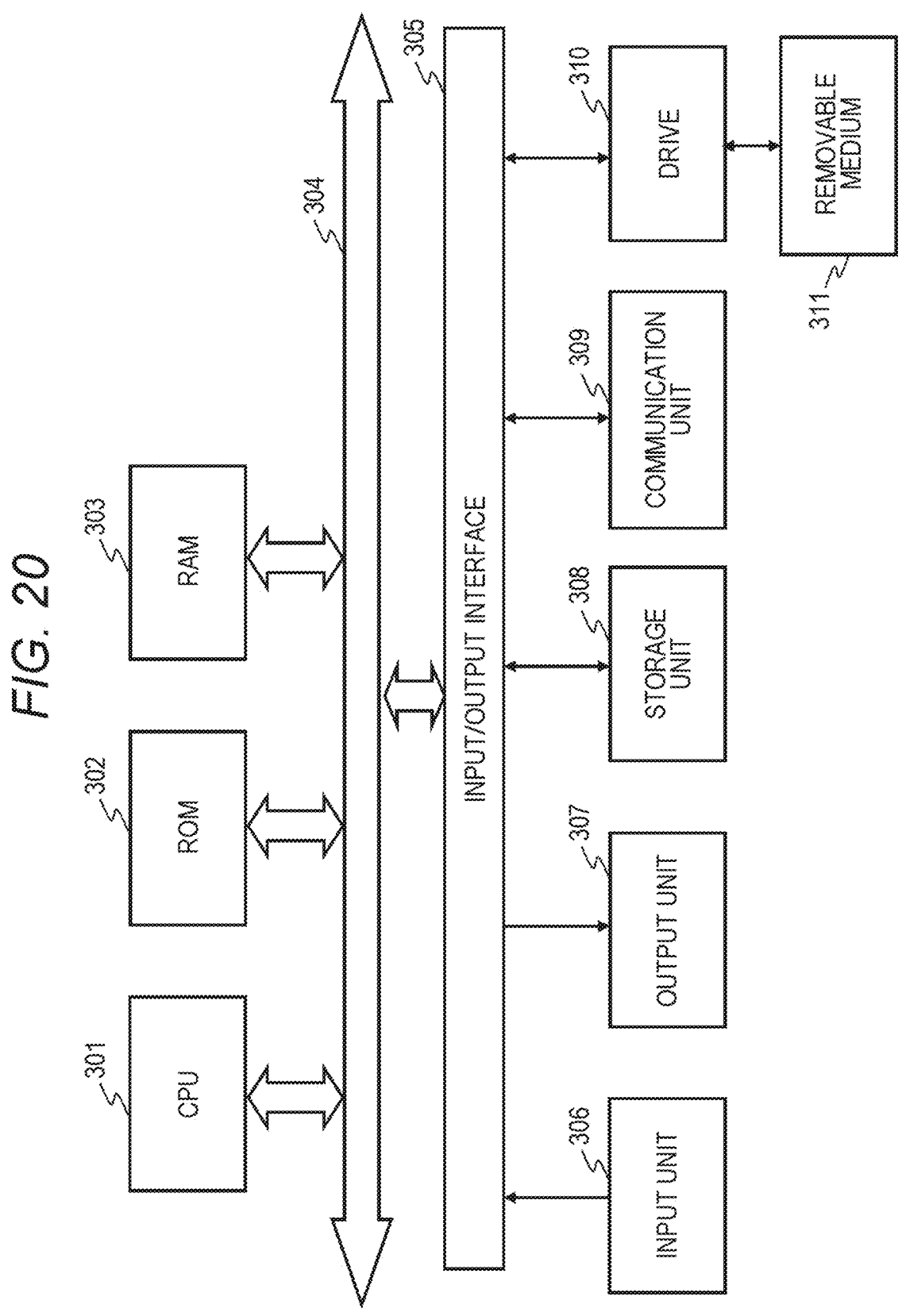
FIG. 20 is a diagram for describing a hardware configuration example of the information processing apparatus of the present disclosure.

FIG. 20 is a diagram illustrating a hardware configuration example that can be used as these information processing apparatuses. Constituent elements of the hardware illustrated in FIG. 20 will be described.

A central processing unit (CPU) 301 functions as a data processing unit that executes various processes according to a program stored in a read only memory (ROM) 302 or a storage unit 308. For example, the processing according to the sequence described in the above-described embodiments is performed. The program to be executed by the CPU 301, data, and the like are stored in a random access memory (RAM) 303. The CPU 301, the ROM 302, and the RAM 303 are mutually connected via a bus 304.

The CPU 301 is connected to an input/output interface 305 via the bus 304, and an input unit 306 including various sensors, a camera, a switch, a keyboard, a mouse, a microphone, and an output unit 307 including a display and a speaker are connected to the input/output interface 305.

The storage unit 308 connected to the input/output interface 305 is configured using, for example, a USB memory, an SD card, a hard disk, and the like and stores a program to be executed by the CPU 301 and various types of data. The communication unit 309 functions as a transmission/reception unit of data communication via a network such as the Internet or a local area network, and communicates with an external device.

A drive 310 connected to the input/output interface 305 drives a removable medium 311 such as a magnetic disk, an optical disk, a magneto-optical disk, and a semiconductor memory such as a memory card, and executes data recording or reading.

[6. Summary of Configuration of Present Disclosure]

Embodiments of the present disclosure have been described in detail with reference to the specific embodiment. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Note that the technology disclosed in the present specification can have the following configurations.

(1) An information processing apparatus including:

a sensor data acquisition unit that acquires detection information of a sensor provided in a mobile body;

a self-position estimation unit that receives an input of the detection information of the sensor from the sensor data acquisition unit and executes self-position estimation of the mobile body;

an environment information analysis unit that receives an input of the detection information of the sensor from the sensor data acquisition unit and analyzes environment information when a self-position estimation process has been executed in the self-position estimation unit; and an estimated self-position reliability calculation unit that calculates a reliability of a self-position estimated by the self-position estimation unit on the basis of the environment information analyzed by the environment information analysis unit.

(2) The information processing apparatus according to (1), in which the environment information analysis unit acquires, as the environment information when the self-position estimation process is executed in the self-position estimation unit, at least any one of pieces of environment information in following (a) to (d):

(a) ambient brightness;

(b) a score of a feature point detected from a camera-captured image;

(c) a number of static objects detected from the camera-captured image or area occupancy of the static objects in the image; and (d) a number of GPS satellites from which GPS signals are receivable.

(3) The information processing apparatus according to (1) or (2), in which the estimated self-position reliability calculation unit calculates a reliability of the self-position estimated by the self-position estimation unit on the basis of at least any one of pieces of the environment information in following (a) to (d) when the self-position estimation process has been executed in the self-position estimation unit:

(a) ambient brightness;

(b) a score of a feature point detected from a camera-captured image;

(c) a number of static objects detected from the camera-captured image or area occupancy of the static objects in the image; and (d) a number of GPS satellites from which GPS signals are receivable.

(4) The information processing apparatus according to any one of (1) to (3), in which the sensor data acquisition unit receives an input of an image captured by a camera constituting the sensor, the environment information analysis unit analyzes ambient brightness when the self-position estimation process has been executed in the self-position estimation unit from the image captured by the camera, and the estimated self-position reliability calculation unit determines that a reliability of the estimated self-position calculated by the self-position estimation unit is higher as the ambient brightness when the self-position estimation process has been executed in the self-position estimation unit is brighter.

(5) The information processing apparatus according to (1, in which the sensor data acquisition unit receives an input of an image captured by a camera constituting the sensor, the environment information analysis unit calculates a feature point score when the self-position estimation process has been executed in the self-position estimation unit from the image captured by the camera, and the estimated self-position reliability calculation unit determines that a reliability of the estimated self-position calculated by the self-position estimation unit is higher as the feature point score when the self-position estimation process has been executed in the self-position estimation unit is higher.

(6) The information processing apparatus according to any one of (1) to (5), in which the sensor data acquisition unit receives an input of an image captured by a camera constituting the sensor, the environment information analysis unit calculates a number of static objects or area occupancy of the static objects in an image when the self-position estimation process has been executed in the self-position estimation unit from the image captured by the camera, and the estimated self-position reliability calculation unit determines that a reliability of the estimated self-position calculated by the self-position estimation unit is higher as the number of the static objects or the area occupancy of the static objects in the image when the self-position estimation process has been executed in the self-position estimation unit increases.

(7) The information processing apparatus according to any one of (1) to (6), in which the sensor data acquisition unit receives an input of a signal received from a GPS constituting the sensor, the environment information analysis unit calculates a number of received GPS satellites of the GPS when the self-position estimation process has been executed in the self-position estimation unit from the image captured by the camera, and the estimated self-position reliability calculation unit determines that a reliability of the estimated self-position calculated by the self-position estimation unit is higher as the number of received GPS satellites of the GPS when the self-position estimation process has been executed in the self-position estimation unit is larger.

(8) The information processing apparatus according to any one of (1) to (7), in which the estimated self-position reliability calculation unit receives at least any one of pieces of the environment information in following (a) to (d) when the self-position estimation process has been executed in the self-position estimation unit:

(a) ambient brightness;

(b) a score of a feature point detected from a camera-captured image;

(c) a number of static objects detected from the camera-captured image or area occupancy of the static objects in the image; and (d) a number of GPS satellites from which GPS signals are receivable, calculates reliabilities of the self-position estimated by the self-position estimation unit on the basis of pieces of the input environment information, respectively, and executes weighted addition processing of the calculated reliabilities respectively corresponding to pieces of the environmental information to calculate a final estimated self-position reliability.

(9) The information processing apparatus according to any one of (1) to (8), in which the estimated self-position reliability calculation unit calculates the reliability of the self-position estimated by the self-position estimation unit, and outputs the calculated reliability of the estimated self-position to an external information display unit.

(10) The information processing apparatus according to any one of (1) to (9), in which the estimated self-position reliability calculation unit calculates the reliability of the self-position estimated by the self-position estimation unit, and outputs a warning to an external information display unit in a case where the calculated reliability of the estimated self-position is less than a predefined threshold.

(11) The information processing apparatus according to any one of (1) to (10), in which the estimated self-position reliability calculation unit calculates the reliability of the self-position estimated by the self-position estimation unit, and outputs an instruction to perform movement control to a mobile body control unit that performs the movement control of the mobile body in a case where the calculated reliability of the estimated self-position is less than a predefined threshold.

(12) The information processing apparatus according to any one of (1) to (11), in which the estimated self-position reliability calculation unit calculates the reliability of the self-position estimated by the self-position estimation unit, and outputs sensing direction control information for controlling a sensing direction of the sensor to the sensor in a case where the calculated reliability of the estimated self-position is less than a predefined threshold.

(13) An information processing system including: a mobile device; and a controller that outputs control information of the mobile device, the mobile device including:

a sensor data acquisition unit that acquires detection information of a sensor provided in the mobile device;

a self-position estimation unit that receives an input of the detection information of the sensor from the sensor data acquisition unit and executes self-position estimation of the mobile body;

an environment information analysis unit that receives an input of the detection information of the sensor from the sensor data acquisition unit and analyzes environment information when a self-position estimation process has been executed in the self-position estimation unit; and an estimated self-position reliability calculation unit that calculates a reliability of a self-position estimated by the self-position estimation unit on the basis of the environment information analyzed by the environment information analysis unit and outputs the calculated reliability of the estimated self-position to the controller, and the controller including:

an information display unit that displays the reliability of the estimated self-position input from the estimated self-position reliability calculation unit of the mobile device;

an operation unit capable of inputting a movement route of the mobile device; and a mobile body control signal output unit that generates the control information for moving the mobile device according to the movement route input via the operation unit and outputs the control information to the mobile device.

(14) An information processing method executed in an information processing apparatus, the information processing method executing:

a sensor data acquisition step of acquiring, by a sensor data acquisition unit, detection information of a sensor provided in a mobile body;

a self-position estimation step of receiving, by a self-position estimation unit, an input of the detection information of the sensor from the sensor data acquisition unit and executing self-position estimation of the mobile body;

an environment information analysis step of receiving, by an environment information analysis unit, an input of the detection information of the sensor from the sensor data acquisition unit and analyzing environment information when a self-position estimation process has been executed in the self-position estimation unit; and an estimated self-position reliability calculation step of calculating, by an estimated self-position reliability calculation unit, a reliability of a self-position estimated by the self-position estimation unit on the basis of the environment information analyzed by the environment information analysis unit.

(15) An information processing method executed in an information processing system including a mobile device and a controller that outputs control information of the mobile device, the information processing method executing:

in the moving apparatus, a sensor data acquisition step of acquiring, by a sensor data acquisition unit, detection information of a sensor provided in a mobile body;

a self-position estimation step of receiving, by a self-position estimation unit, an input of the detection information of the sensor from the sensor data acquisition unit and executing self-position estimation of the mobile body;

an environment information analysis step of receiving, by an environment information analysis unit, an input of the detection information of the sensor from the sensor data acquisition unit and analyzing environment information when a self-position estimation process has been executed in the self-position estimation unit; and an estimated self-position reliability calculation step of calculating, by an estimated self-position reliability calculation unit, a reliability of a self-position estimated by the self-position estimation unit on the basis of the environment information analyzed by the environment information analysis unit and outputting the calculated reliability of the estimated self-position to the controller, and in the controller, an information display step of displaying, by an information display unit, the reliability of the estimated self-position input from the estimated self-position reliability calculation unit of the mobile device; and a mobile body control signal output step of generating, by a mobile body control signal output unit, the control information for moving the mobile device according to a movement route in response to an input of the movement route of the mobile device via an operation unit, and outputting the control information to the mobile device.

(16) A program for causing an information processing apparatus to execute information processing, the program causing:

a sensor data acquisition unit to execute a sensor data acquisition step of acquiring detection information of a sensor provided in a mobile body;

a self-position estimation unit to execute a self-position estimation step of receiving an input of the detection information of the sensor from the sensor data acquisition unit and executing self-position estimation of the mobile body;

an environment information analysis unit to execute an environment information analysis step of receiving an input of the detection information of the sensor from the sensor data acquisition unit and analyzing environment information when a self-position estimation process has been executed in the self-position estimation unit; and an estimated self-position reliability calculation unit to execute an estimated self-position reliability calculation step of calculating a reliability of a self-position estimated by the self-position estimation unit on the basis of the environment information analyzed by the environment information analysis unit.

Furthermore, the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, a configuration is achieved in which a reliability of self-position estimation of a mobile device, such as a drone, is calculated to perform warning display and flight control according to the configuration of an embodiment of the present disclosure.

Specifically, for example, a sensor data acquisition unit that acquires detection information of a sensor provided in a mobile body, a self-position estimation unit that receives an input of the detection information of the sensor from the sensor data acquisition unit and executes self-position estimation of the mobile body, an environment information analysis unit that analyzes environment information such as ambient brightness when a self-position estimation process has been executed in the self-position estimation unit and a score of a feature point of a camera-captured image, and an estimated self-position reliability calculation unit that calculates a reliability of a self-position estimated by the self-position estimation unit on the basis of the environment information analyzed by the environment information analysis unit are provided to perform the warning display and the flight control on the basis of the calculated reliability.

With this configuration, the configuration is achieved in which the reliability of the self-position estimation of the mobile device, such as the drone, is calculated to perform the warning display and the flight control.

REFERENCE SIGNS LIST

10 Drone
20 Controller
100 Information processing apparatus
101 to 103 Sensor
104 Sensor data acquisition unit
105 Self-position estimation unit
106 Environment information analysis unit
107 Estimated self-position reliability calculation unit
108 Mobile body control unit
120 Display device
121 Information display unit
130 Controller
131 Information display unit
132 Operation unit
133 Mobile body control signal output unit
301 CPU
302 ROM
303 RAM 304 Bus
305 Input/output interface
306 Input unit
307 Output unit
308 Storage unit
309 Communication unit
310 Drive
311 Removable medium

The invention claimed is:

1. An information processing apparatus, comprising:
a central processing unit (CPU) configured to:
   acquire detection information of a sensor in a mobile body;
   execute a self-position estimation process of the mobile body based on the acquired detection information;
   analyze, in parallel to the execution of the self-position estimation process, environment information based on the acquired detection information;
   estimate a self-position of the mobile body based on the execution of the self-position estimation process;
   calculate a reliability of the estimated self-position based on the analyzed environment information; and
   verify a change in the calculated reliability, wherein the calculated reliability increases in a first direction of the sensor, and
      the calculated reliability decreases in a second direction of the sensor.
2. The information processing apparatus according to claim 1, wherein
   the CPU is further configured to acquire, in parallel to the execution of the self-position estimation process, at least one of a plurality of pieces of the environment information, and
   the plurality of pieces of the environment information includes:
      ambient brightness;
      a score of a feature point in a camera-captured image;
      one of a number of static objects in the camera-captured image or an area occupancy of the static objects in the camera-captured image; and
      a number of GPS satellites from which GPS signals are receivable to the information processing apparatus.
3. The information processing apparatus according to claim 1, wherein
   the CPU is further configured to calculate, in parallel to the execution of the self-position estimation process, the reliability of the estimated self-position based on at least one of a plurality of pieces of the environment information, and
   the plurality of pieces of the environment information includes:
      ambient brightness;
      a score of a feature point in a camera-captured image;
      one of a number of static objects in the camera-captured image or an area occupancy of the static objects in the camera-captured image; and
      a number of GPS satellites from which GPS signals are receivable to the information processing apparatus.
4. The information processing apparatus according to claim 1, wherein the CPU is further configured to:
   receive an image captured by a camera, wherein the sensor includes the camera;
   analyze, in parallel to the execution of the self-position estimation process, ambient brightness based on the received image; and determine, based on the analysis of the ambient brightness, that the calculated reliability of the estimated self-position increases as the ambient brightness increases.
5. The information processing apparatus according to claim 1, wherein the CPU is further configured to:
   receive an image captured by a camera, wherein the sensor includes the camera;
   calculate, in parallel to the execution of the self-position estimation process, a feature point score from the received image; and
   determine that the calculated reliability of the estimated self-position increases as the calculated feature point score increases.
6. The information processing apparatus according to claim 1, wherein the CPU is further configured to:
   receive an image captured by a camera, wherein the sensor includes the camera;
   calculate, in parallel to the execution of the self-position estimation process, one of a number of static objects or an area occupancy of the static objects in the received image; and
   determine that the calculated reliability of the estimated self-position increases as the calculated one of the number of the static objects or the area occupancy of the static objects increases.
7. The information processing apparatus according to claim 1, wherein the CPU is further configured to:
   receive a signal from a GPS, wherein the sensor includes the GPS;
   calculate, in parallel to the execution of the self-position estimation process, a number of GPS satellites based on the received signal; and
   determine that the calculated reliability of the estimated self-position increases as the calculated number of GPS satellites increases.
8. The information processing apparatus according to claim 1, wherein the CPU is further configured to:
   receive, in parallel to the execution of the self-position estimation process, at least one of a plurality of pieces of the environment information, wherein the plurality of pieces of the environment information includes:
      ambient brightness;
      a score of a feature point in a camera-captured image;
      one of a number of static objects in the camera-captured image or an area occupancy of the static objects in the camera-captured image; and
      a number of GPS satellites from which GPS signals are receivable to the information processing apparatus;
   calculate a plurality of reliabilities of the estimated self-position based on the plurality of pieces of the environment information, wherein the calculated plurality of reliabilities includes the calculated reliability;
   execute a weighted addition process on the calculated plurality of reliabilities corresponding to the plurality of pieces of the environment information; and
   calculate, based on the execution of the weighted addition process, a final self-position reliability of the estimated self-position.
9. The information processing apparatus according to claim 1, wherein
   the CPU is further configured to output the calculated reliability of the estimated self-position to an external information display device.
10. The information processing apparatus according to claim 1, wherein the CPU is further configured to:

determine that the calculated reliability of the estimated self-position is less than a specific threshold; and output a warning to an external information display device based on the determination that the calculated reliability is less than the specific threshold.

11. The information processing apparatus according to claim 1, wherein the CPU is further configured to:

determine that the calculated reliability of the estimated self-position is less than a specific threshold; and perform, based on the determination that the calculated reliability is less than the specific threshold, a movement control process to control a movement of the mobile body.

12. The information processing apparatus according to claim 1, wherein the CPU is further configured to:

determine that the calculated reliability of the estimated self-position is less than a specific threshold; and control a sensing direction of the sensor based on the determination that the calculated reliability is less than the specific threshold, wherein the sensing direction of the sensor is one of the first direction of the sensor or the second direction of the sensor.

13. An information processing system, comprising:

a controller; and a mobile device that includes a sensor and a first central processing unit (CPU) configured to:

acquire detection information of the sensor;

execute a self-position estimation process of the mobile device based on the acquired detection information;

analyze, in parallel to the execution of the self-position estimation process, environment information based on the acquired detection information;

estimate a self-position of the mobile device based on the execution of the self-position estimation process;

calculate a reliability of the estimated self-position based on the analyzed environment information;

verify a change in the calculated reliability, wherein the calculated reliability increases in a first direction of the sensor, and the calculated reliability decreases in a second direction of the sensor; and output the verified change in the calculated reliability of the estimated self-position to the controller, wherein the controller includes a second CPU configured to:

control a display device to display the verified change in the calculated reliability of the estimated self-position;

generate a movement route of the mobile device based on the verified change in the calculated reliability;

generate control information for the mobile device based on the generated movement route; and output the generated control information to the mobile device.

14. An information processing method, comprising:

acquiring detection information of a sensor in a mobile body;

executing a self-position estimation process of the mobile body based on the acquired detection information;

analyzing, in parallel to the execution of the self-position estimation process, environment information based on the acquired detection information;

estimating a self-position of the mobile body based on the execution of the self- position estimation process;

calculating a reliability of the estimated self-position based on the analyzed environment information; and verifying a change in the calculated reliability, wherein the calculated reliability increases in a first direction of the sensor, and the calculated reliability decreases in a second direction of the sensor.

15. An information processing method, comprising:

in a mobile device:

acquiring detection information of a sensor in the mobile device;

executing a self-position estimation process of the mobile device based on the acquired detection information;

analyzing, in parallel to the execution of the self-position estimation process, environment information based on the acquired detection information;

estimating a self-position of the mobile device based on the execution of the self-position estimation process;

calculating a reliability of the estimated self-position based on analyzed environment information;

verifying a change in the calculated reliability, wherein the calculated reliability increases in a first direction of the sensor, and the calculated reliability decreases in a second direction of the sensor; and outputting the verified change in the calculated reliability of the estimated self-position to a controller, and in the controller:

displaying the verified change in the calculated reliability of the estimated self-position;

generating a movement route of the mobile device based on the verified change in the calculated reliability;

generating control information for the mobile device based on the generated movement route; and outputting the generated control information to the mobile device.

16. A non-transitory computer-readable medium having stored thereon, computer-executable instructions which, when executed by a central processing unit (CPU), cause the CPU to execute operations, the operations comprising:

acquiring detection information of a sensor in a mobile body;

executing a self-position estimation process of the mobile body based on the acquired detection information;

analyzing, in parallel to the execution of the self-position estimation process, environment information based on the acquired detection information;

estimating a self-position of the mobile body based on the execution of the self- position estimation process;

calculating a reliability of the estimated self-position based on the analyzed environment information; and verifying a change in the calculated reliability, wherein the calculated reliability increases in a first direction of the sensor, and the calculated reliability decreases in a second direction of the sensor.

* * * * *